(12) United States Patent
Ohashi et al.

(10) Patent No.: US 11,335,071 B2
(45) Date of Patent: May 17, 2022

(54) IMAGE GENERATION APPARATUS AND IMAGE GENERATION METHOD FOR AUGMENTED REALITY IMAGES BASED ON OBJECT INTERACTION

(71) Applicant: Sony Interactive Entertainment Inc., Tokyo (JP)

(72) Inventors: Yoshinori Ohashi, Tokyo (JP); Masaomi Nishidate, Tokyo (JP); Norihiro Nagai, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/261,999

(22) PCT Filed: Aug. 2, 2018

(86) PCT No.: PCT/JP2018/029104
§ 371 (c)(1),
(2) Date: Jan. 21, 2021

(87) PCT Pub. No.: WO2020/026419
PCT Pub. Date: Feb. 6, 2020

(65) Prior Publication Data
US 2021/0390782 A1    Dec. 16, 2021

(51) Int. Cl.
*G06T 19/00*     (2011.01)
*G02B 27/01*    (2006.01)
*G06F 3/01*      (2006.01)

(52) U.S. Cl.
CPC .......... *G06T 19/006* (2013.01); *G02B 27/017* (2013.01); *G06F 3/012* (2013.01)

(58) Field of Classification Search
CPC ..... G06T 19/006; G02B 27/017; G06F 3/012; G06F 3/011; G06F 3/017; G06F 3/0346
See application file for complete search history.

(56) References Cited

U.S. PATENT DOCUMENTS

| 10,339,712 B2 | 7/2019 | Takemoto |
| 2009/0102845 A1 | 4/2009 | Takemoto |

(Continued)

FOREIGN PATENT DOCUMENTS

| JP | 2009025918 A | 2/2009 |
| JP | 2009104249 A | 5/2009 |

(Continued)

OTHER PUBLICATIONS

International Search Report for corresponding Application PCT/JP2018/029104, 4 pages, dated Sep. 11, 2018.

(Continued)

*Primary Examiner* — Jeffery A Brier
(74) *Attorney, Agent, or Firm* — Matthew B. Dernier, Esq.

(57) ABSTRACT

A moving-object position and orientation acquisition section acquires a position and an orientation of a moving object detected by a tracker provided in the moving object to be moved by a user. An AR region determination section determines, as an augmented reality region, a region that corresponds to a partial space occupied by the moving object in a real world and viewed from a viewpoint of the user. The moving object is configured to be moved by the user. An AR generation section generates an augmented reality image in the augmented reality region in a shot image of the real world.

12 Claims, 18 Drawing Sheets

(56) References Cited

U.S. PATENT DOCUMENTS

2017/0243324 A1\* 8/2017 Mierle .................... G06T 11/60
2018/0108179 A1\* 4/2018 Tomlin .................. G06F 3/0346

FOREIGN PATENT DOCUMENTS

JP         2017215875 A     12/2017
JP         2018109835 A     7/2018

OTHER PUBLICATIONS

International Preliminary Report on Patentability and Written Opinion for corresponding PCT Application No. PCT/JP2018/029104, 17 pages, dated Feb. 11, 2021.

\* cited by examiner

IMAGE GENERATION APPARATUS AND IMAGE GENERATION METHOD FOR AUGMENTED REALITY IMAGES BASED ON OBJECT INTERACTION

TECHNICAL FIELD

The present invention relates to an apparatus and a method for generating an image.

BACKGROUND ART

It has been common practice to wear a head-mounted display connected to a game machine on the head and play a game by operating a controller or the like while viewing a screen displayed on the head-mounted display. Wearing the head-mounted display provides effects of increasing a sense of immersion in a video world and further enhancing an entertainment property of the game, since the user views nothing other than the video displayed on the head-mounted display. Further, causing the head-mounted display to display a virtual reality (VR) video and display, when the user wearing the head-mounted display turns the head, a 360-degree view of an entire circumferential virtual space further increases a sense of immersion in the video and improves operability of an application such as a game.

Further, although the user wearing a head-mounted display of a non-transmissive type cannot directly view the outside world, there is also a video-transmissive (video see-through) head-mounted display that can shoot a video of the outside world using a camera mounted in the head-mounted display and display the video on a display panel. The video-transmissive head-mounted display can also generate and display an augmented reality (AR) video by superimposing a virtual world object generated using computer graphics (CG) on the video of the outside world shot by the camera. An augmented reality video is different from a virtual reality, which is disconnected from the real world, in that the augmented reality video is augmentation of the real world with a virtual object and enables the user to experience the virtual world while the user is aware of a connection with the real world.

SUMMARY

Technical Problem

Upon displaying an augmented reality video on the head-mounted display, suddenly superimposing a virtual world object generated using CG on a video of the outside world shot by the camera mounted in the head-mounted display results in a discontinuous connection between the real world and the virtual world. This may, in some cases, give the user a feeling of strangeness.

The present invention has been made in view of the above-described issue. It is an object of the present invention to provide an image generation apparatus and an image generation method that can reduce the feeling of strangeness toward an augmented reality video.

Solution to Problem

In order to solve the above-described issue, an image generation apparatus according to one aspect of the present invention includes a determination section configured to determine, as an augmented reality region, a region that corresponds to a partial space occupied by a moving object in a real world and viewed from a viewpoint of a user, the moving object being configured to be moved by the user, and an augmented reality generation section configured to generate an augmented reality image in the augmented reality region in a shot image of the real world.

Another aspect of the present invention is an image generation method. The method includes a determination step of determining, as an augmented reality region, a region that corresponds to a partial space occupied by a moving object in a real world and viewed from a viewpoint of a user, the moving object being configured to be moved by the user, and an augmented reality generation step of generating an augmented reality image in the augmented reality region in a shot image of the real world.

It is noted that any combinations of the components described above and the expressions of the present invention that are converted between a method, an apparatus, a system, a computer program, data structure, a recording medium, and the like are also effective as aspects of the present invention.

Advantageous Effect of Invention

According to the present invention, the feeling of strangeness toward an augmented reality video can be reduced.

DESCRIPTION OF EMBODIMENT

Figure 1:
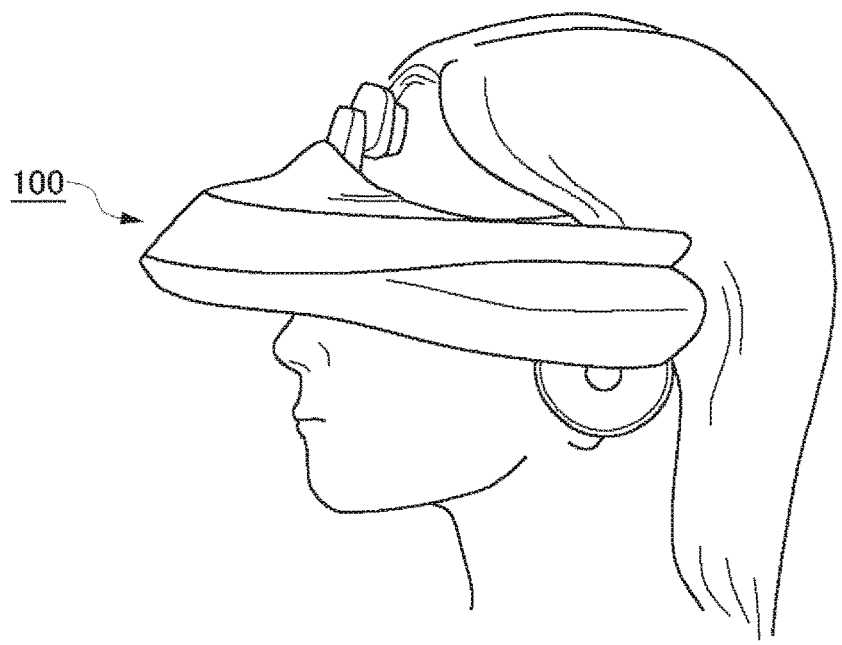
FIG. 1 is an external view of a head-mounted display.

FIG. 1 is an external view of a head-mounted display 100. The head-mounted display 100 is a display apparatus that is worn on the head of the user and allows the user to watch a still image, a moving image, and the like displayed on a display and listen to audio, music, and the like output from headphones.

Position information of the head of the user wearing the head-mounted display 100 and orientation information such as the rotation angle and inclination of the head can be measured by a gyro sensor, an acceleration sensor, and the like incorporated in or externally attached to the head-mounted display 100.

The head-mounted display 100 is provided with a camera unit that can shoot the outside world while the user wears the head-mounted display 100.

The head-mounted display 100 is an example of a "wearable display." Although a method of generating an image to be displayed on the head-mounted display 100 will be described here, the application of the image generation method according to the present embodiment is not limited to the head-mounted display 100 in a narrow sense. The image generation method according to the present embodiment can also be applied to a case where the user wears glasses, a glasses-type display, a glasses-type camera, headphones, a headset (headphones with a microphone), earphones, earrings, an ear-hook camera, a headwear, a headwear with a camera, a hairband, or the like.

Figure 2:
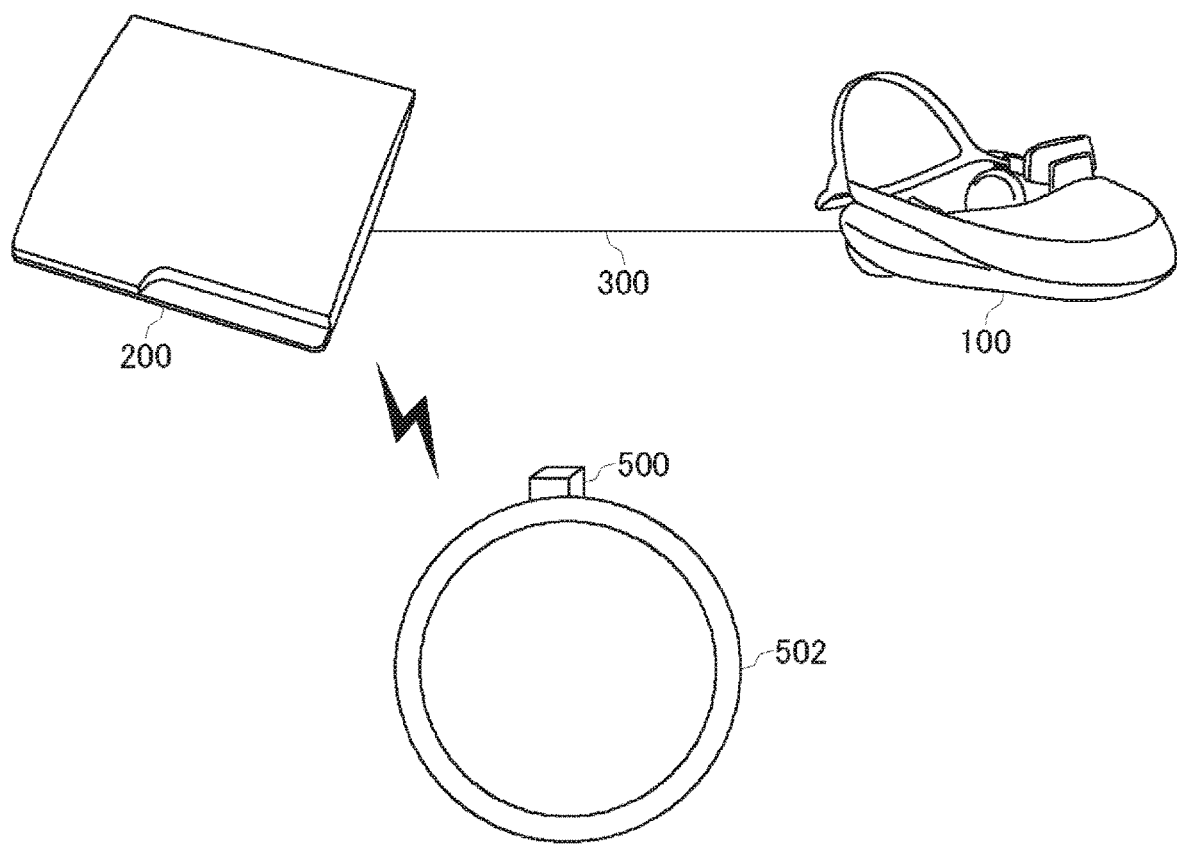
FIG. 2 is a configuration diagram of an image generation system according to the present embodiment.

FIG. 2 is a configuration diagram of an image generation system according to the present embodiment. As an example, the head-mounted display 100 is connected to an image generation apparatus 200 with an interface 300 such as an HDMI (registered trademark) (High-Definition Multimedia Interface), which is a standard of a communication interface that transmits a video and audio as digital signals.

On the basis of current position and orientation information of the head-mounted display 100, the image generation apparatus 200 predicts position and orientation information of the head-mounted display 100, taking into account a delay from the generation of a video to the display thereof. The image generation apparatus 200 then draws an image to be displayed on the head-mounted display 100 on the premise of the predicted position and orientation information of the head-mounted display 100 and transmits the image to the head-mounted display 100.

One example of the image generation apparatus 200 is a game machine. The image generation apparatus 200 may further be connected to a server via a network. In this case, the server may provide the image generation apparatus 200 with an online application such as a game in which a plurality of users can participate over the network. The head-mounted display 100 may be connected to a computer or a mobile terminal instead of the image generation apparatus 200.

A moving object 502 is an object that the user moves in the real world. Although a ring (hoop) held and moved by the user's hand will be described as an example of the moving object 502 here, the moving object 502 is not limited thereto. The moving object 502 occupies a predetermined partial space in the real world. An augmented reality image is generated and displayed in a region that corresponds to this partial space occupied by the moving object 502 and viewed from a viewpoint of the user. This region in which the augmented reality image is displayed will be referred to as an "AR region." If the moving object 502 is a hoop, the AR region is a region that is visible when the user looks through the hoop from the viewpoint of the user. Superimposing a predetermined effect or an image of a virtual object on an image shot by the camera may generate and display an augmented reality image in the AR region. Alternatively, instead of the image shot by the camera, another different CG image may be generated and displayed in the AR region.

In one embodiment, a tracker 500 is attached to the moving object 502. The tracker 500 includes sensors such as an inertial sensor, a magnetic field sensor, an acceleration sensor, and a motion sensor and can detect the position and orientation of the moving object 502. The partial space occupied by the moving object 502 in the real world is determined according to the position and orientation of the moving object 502. The tracker 500 transmits the detected position and orientation of the moving object 502 to the image generation apparatus 200.

In another embodiment, markers are attached to the moving object 502. The image generation apparatus 200 detects the position and orientation of the moving object 502 by performing image recognition of the markers in a camera image, and determines the partial space occupied by the moving object 502 in the real world. For example, by recognizing three markers, the image generation apparatus 200 can detect the position and orientation of the moving object 502 from the position and shape of a triangle created by the markers. The image generation apparatus 200 may detect the position and orientation of the moving object 502 by performing image recognition of the design or pattern of the moving object 502. If the moving object 502 is the hoop, the image generation apparatus 200 may detect the position and orientation of the moving object 502 by extracting a circular or oval shape from a camera image.

Figure 3:
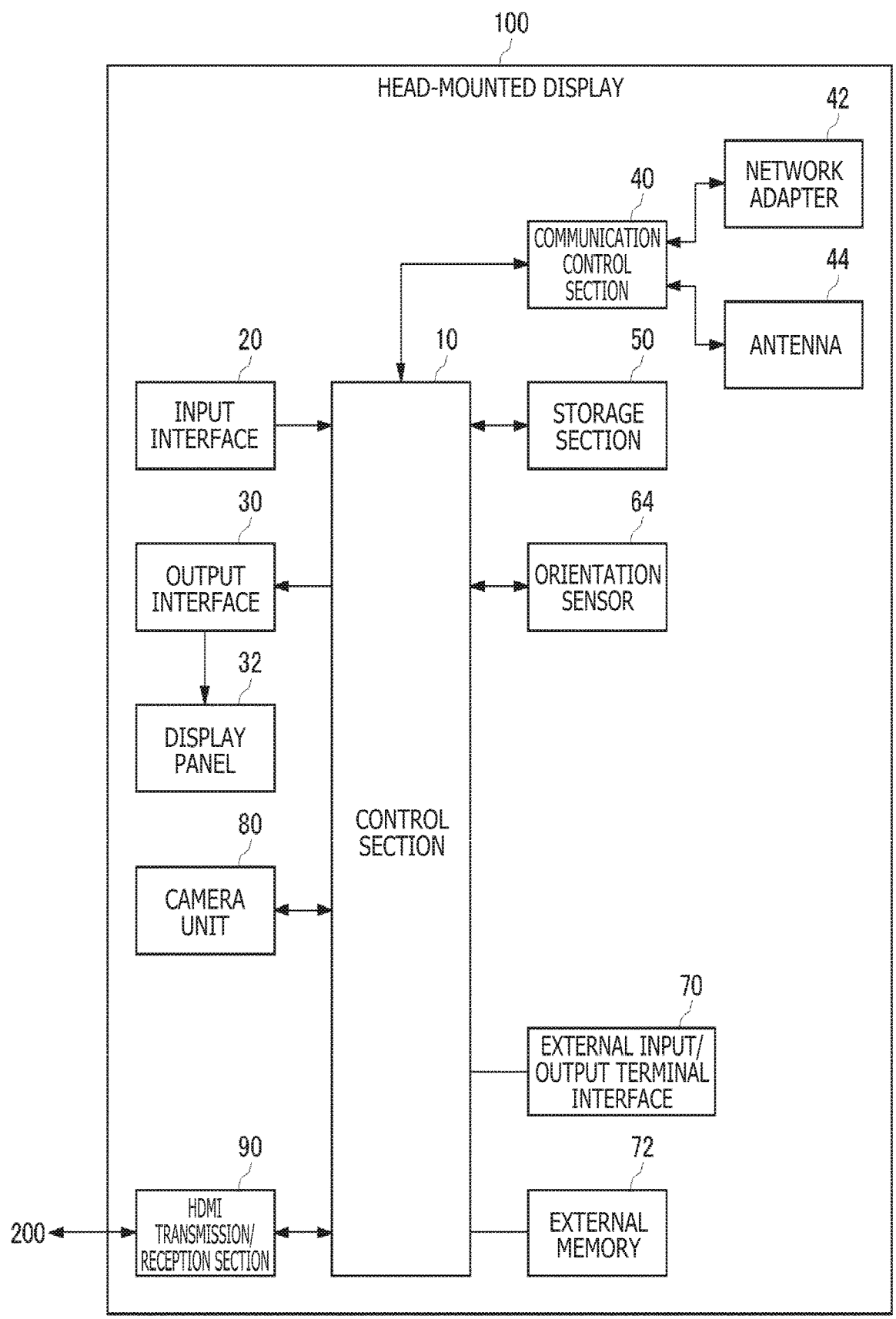
FIG. 3 is a functional configuration diagram of the head-mounted display.

FIG. 3 is a functional configuration diagram of the head-mounted display 100.

A control section 10 is a main processor that processes and outputs signals such as image signals and sensor signals, instructions, and data. An input interface 20 receives operation signals and setting signals from the user and supplies these signals to the control section 10. An output interface 30 receives image signals from the control section 10 and performs display on a display panel 32.

A communication control section 40 transmits data input from the control section 10 to the outside through wired or wireless communication via a network adapter 42 or an antenna 44. The communication control section 40 also receives data from the outside through wired or wireless communication via the network adapter 42 or the antenna 44 and outputs the data to the control section 10.

A storage section 50 temporarily stores data, parameters, operation signals, and the like that are processed by the control section 10.

An orientation sensor 64 detects position information of the head-mounted display 100 and orientation information such as the rotation angle and inclination of the head-mounted display 100. The orientation sensor 64 is implemented by appropriately combining a gyro sensor, an acceleration sensor, an angular acceleration sensor, and the like. The forward and rearward, rightward and leftward, and upward and downward movements of the head of the user may be detected by using a motion sensor implemented by combining at least one or more of a three-axis magnetic field sensor, a three-axis acceleration sensor, and a three-axis gyro (angular velocity) sensor.

An external input/output terminal interface 70 is an interface for connecting peripheral equipment such as a USB (Universal Serial Bus) controller. An external memory 72 is an external memory such as a flash memory.

A camera unit 80 includes configurations necessary for shooting such as a lens, an image sensor, and a range sensor and supplies a video and depth information of the shot outside world to the control section 10. The control section 10 controls a focus, zoom, and the like of the camera unit 80.

An HDMI transmission/reception section 90 transmits and receives digital signals of a video and audio to and from the image generation apparatus 200 according to an HDMI. The HDMI transmission/reception section 90 receives a video and depth information of the outside world shot by the camera unit 80 from the control section 10 and transmits the video and the depth information to the image generation apparatus 200 via an HDMI transmission path. The HDMI transmission/reception section 90 receives an image generated by the image generation apparatus 200 from the image generation apparatus 200 via the HDMI transmission path and supplies the image to the control section 10.

The control section 10 can supply an image and text data to the output interface 30 to cause the display panel 32 to display the image and the text data or can supply the image and the text data to the communication control section 40 to cause the communication control section 40 to transmit the image or the text data to the outside.

The image generation apparatus 200 is notified of the current position and orientation information of the head-mounted display 100 detected by the orientation sensor 64 via the communication control section 40 or the external input/output terminal interface 70. Alternatively, the HDMI transmission/reception section 90 may transmit the current position and orientation information of the head-mounted display 100 to the image generation apparatus 200.

Figure 4:
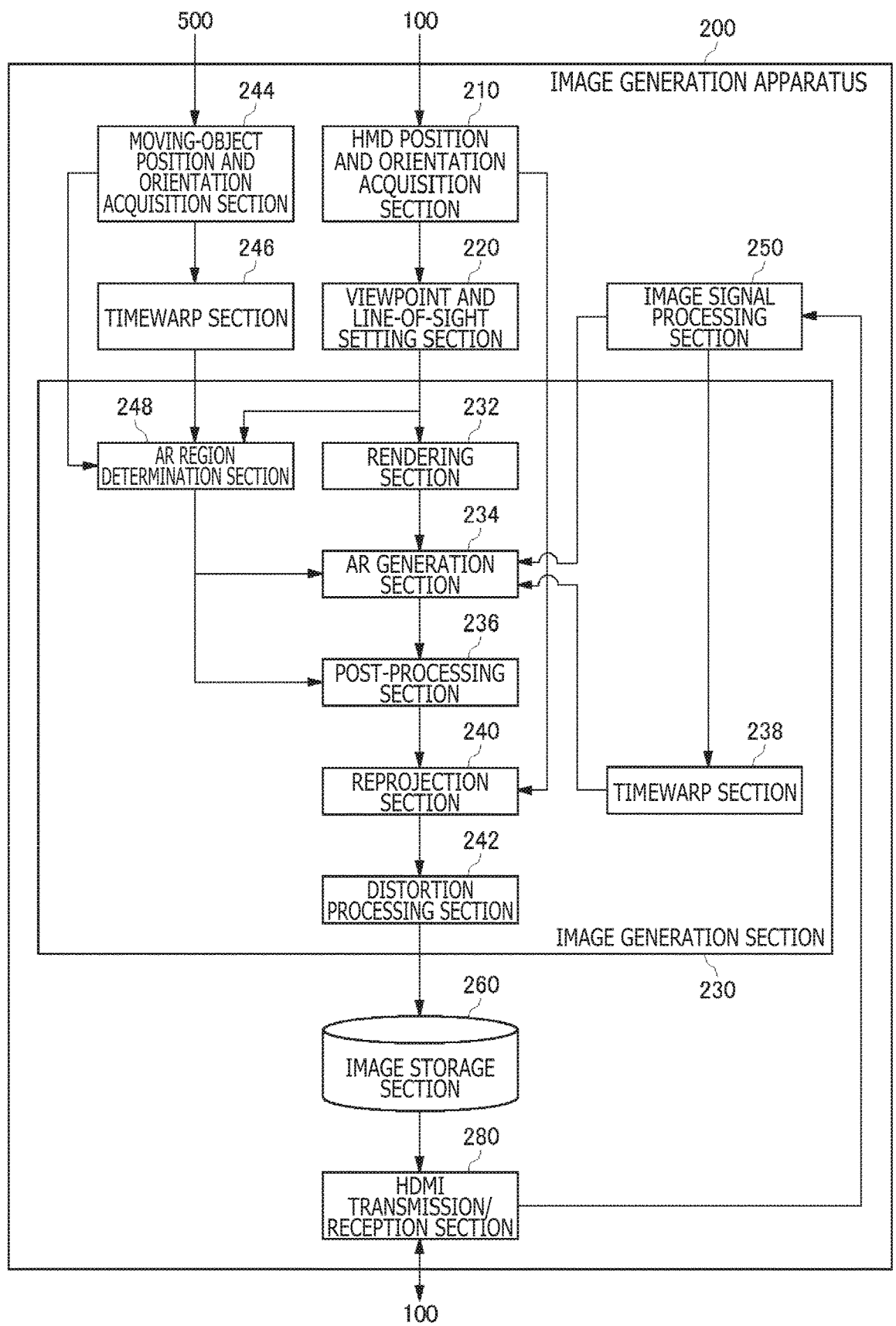
FIG. 4 is a functional configuration diagram of an image generation apparatus according to the present embodiment.

FIG. 4 is a functional configuration diagram of the image generation apparatus 200 according to the present embodiment. This figure illustrates a block diagram focusing on functions, and these functional blocks can be implemented in various forms by hardware only, software only, or a combination thereof.

At least some of the functions of the image generation apparatus 200 may be implemented in the head-mounted display 100. Alternatively, at least some of the functions of the image generation apparatus 200 may be implemented in the server connected to the image generation apparatus 200 via the network.

An HMD position and orientation acquisition section 210 acquires current position and orientation information of the head-mounted display 100 from the head-mounted display 100. The HMD position and orientation acquisition section 210 may acquire an inertial measurement unit (IMU) data, which indicates the current orientation information of the head-mounted display 100, from an IMU such as the orientation sensor 64 of the head-mounted display 100, and may estimate the orientation of the user wearing the head-mounted display 100 by performing simultaneous localization and mapping (SLAM) processing using a camera image and the IMU data. The SLAM processing is processing in which self-position estimation and environment map creation are performed simultaneously.

A viewpoint and line-of-sight setting section 220 sets the viewpoint position and line-of-sight direction of the user, using the position and orientation information of the head-mounted display 100 acquired by the HMD position and orientation acquisition section 210.

A moving-object position and orientation acquisition section 244 acquires the position and orientation of the moving object 502 and supplies the position and orientation of the moving object 502 to a timewarp section 246 and an AR region determination section 248. In one embodiment, the moving-object position and orientation acquisition section 244 acquires the position and orientation of the moving object 502 detected by the tracker 500. In another embodiment, the moving-object position and orientation acquisition section 244 acquires the position and orientation of the moving object 502 by performing image recognition of the markers, shape, patterns, or the like of the moving object 502 in the shot image.

On the basis of a difference between a timestamp at the point in time of acquisition of the position and orientation of the tracker 500 and a timestamp at the point in time of estimation of the position and orientation of the head-mounted display 100, the timewarp section 246 transforms the position and orientation of the moving object 502 such that the position and orientation of the moving object 502 correspond to the timestamp at the point in time of estimation of the position and orientation of the head-mounted display 100.

An HDMI transmission/reception section 280 receives a video of the real space shot by the camera unit 80 from the head-mounted display 100 and supplies the video to an image signal processing section 250.

The image signal processing section 250 performs image signal processing (ISP) such as red-green-blue (RGB) conversion (demosaicing), white balance, color correction, and noise reduction on a Raw image shot by the camera unit 80 of the head-mounted display 100. The image signal processing section 250 further performs distortion correction processing on the Raw image to remove distortion and the like caused by an optical system of the camera unit 80. The image signal processing section 250 supplies an RGB image on which the image signal processing and the distortion correction processing have been performed to an image generation section 230.

The image generation section 230 generates a CG image by reading data necessary to generate CG from an image storage section 260 and rendering a virtual space object. The image generation section 230 then generates an augmented reality image by superimposing the generated CG image on a camera image of the real space provided from the image signal processing section 250 or drawing the CG image instead of the camera image, and outputs the augmented reality image to the image storage section 260.

The image generation section 230 includes the AR region determination section 248, a rendering section 232, an AR generation section 234, a post-processing section 236, a timewarp section 238, a reprojection section 240, and a distortion processing section 242.

The AR region determination section 248 acquires the viewpoint position and line-of-sight direction of the user from the viewpoint and line-of-sight setting section 220. On the basis of the position and orientation of the moving object 502 acquired by the moving-object position and orientation acquisition section 244 or the position and orientation of the moving object 502 converted by the timewarp section 246, the AR region determination section 248 determines, as the AR region, a region that corresponds to a partial space occupied by the moving object 502 in the real world and viewed from the viewpoint position and line-of-sight direction of the user. The AR region determination section 248 then supplies information indicating the AR region to the AR generation section 234 and the post-processing section 236.

In a case where the moving object 502 is the hoop like the one illustrated in FIG. 2, the AR region determination section 248 determines, as the AR region, the region that corresponds to the partial space determined by the inside of the hoop and viewed from the viewpoint position and line-of-sight direction of the user. On the basis of the position and orientation of the moving object 502 and the viewpoint position and line-of-sight direction of the user, the shape of the inside of the hoop on the screen displayed on the display panel 32 of the head-mounted display 100 turns into a circle or an oval, and the area inside the hoop also changes accordingly.

According to the viewpoint position and line-of-sight direction of the user set by the viewpoint and line-of-sight setting section 220, the rendering section 232 renders a virtual space object that is visible in the line-of-sight direction from the viewpoint position of the user wearing the head-mounted display 100. The rendering section 232 then gives the virtual space object to the AR generation section 234.

Further, the rendering section 232 may apply an effect to a body part of the user, such as a hand, that appears in a camera video or may replace this body part with a virtual model. The position and orientation of the body part of the user may be estimated from the position and orientation of the tracker 500. Alternatively, the user may wear a different tracker on the body part to facilitate the estimation of the position and orientation of the body part.

The AR generation section 234 generates an augmented reality image by superimposing the CG image generated by the rendering section 232 on the camera image, which is supplied from the image signal processing section 250, or drawing, instead of the camera image, the CG image in the AR region specified by the AR region determination section 248 in the camera image. The AR generation section 234 then gives the augmented reality image to the post-processing section 236.

The post-processing section 236 performs post-processing such as depth-of-field adjustment, tone mapping, and anti-aliasing on the augmented reality image in such a manner that the augmented reality image obtained by superimposing the virtual object on the image of the real space looks natural and smooth. Further, the post-processing section 236 may apply various kinds of effects to the AR region specified by the AR region determination section 248. The post-processing section 236 may simply apply an effect to the camera image in the AR region without a CG image being superimposed or drawn for replacement in the AR region by the AR generation section 234.

The reprojection section 240 receives the latest position and orientation information of the head-mounted display 100 from the HMD position and orientation acquisition section 210 and performs reprojection processing on the augmented reality image on which the post-processing has been performed, to convert the image into an image that is visible from the latest viewpoint position and line-of-sight direction of the head-mounted display 100.

Here, reprojection will be described. Assume that the head-mounted display 100 has a head tracking function and that a virtual reality video is generated such that the viewpoint and the line-of-sight direction are changed in association with the movement of the head of the user. In this case, since there is a delay from the generation of the virtual reality video to the display thereof, a deviation occurs between the direction of the head of the user used as a premise at the time of generation of the video and the direction of the head of the user at the time when the video is displayed on the head-mounted display 100. Such a deviation may, in some cases, make the user feel as if the user got motion sickness (called VR sickness or the like).

In this manner, it takes time until the movement of the head-mounted display 100 is detected, a central processing unit (CPU) issues a drawing command, a graphics processing unit (GPU) performs rendering, and the drawn image is output to the head-mounted display 100. Assume that drawing is performed at a frame rate of 60 fps (frames/second), for example, and there is a delay of one frame until the image is output after the movement of the head-mounted display 100 is detected. This delay is approximately 16.67 milliseconds under a frame rate of 60 fps, which is sufficient time for a human to perceive the deviation.

Therefore, processing called "timewarp" or "reprojection" is performed to correct the rendered image according to the latest position and orientation of the head-mounted display 100. This makes a human less likely to perceive the deviation.

The distortion processing section 242 performs distortion processing on the augmented reality image on which the reprojection processing has been performed by deforming (distorting) the image according to the distortion caused by the optical system of the head-mounted display 100. The distortion processing section 242 then stores the resulting image in the image storage section 260.

The HDMI transmission/reception section 280 reads frame data of the augmented reality image, which has been generated by the image generation section 230, from the image storage section 260 and transmits the frame data to the head-mounted display 100 according to the HDMI.

On the basis of the difference between the timestamp at the point in time of camera shooting and the timestamp at the point in time of acquisition of the position and orientation of the head-mounted display 100, the timewarp section 238 transforms the camera image supplied from the image signal processing section 250 such that the camera image corresponds to the timestamp at the point in time of acquisition of the position and orientation of the head-mounted display 100. The timewarp section 238 then gives the resulting camera image to the AR generation section 234. This timewarp processing is particularly effective in a case where the position and orientation of the moving object 502 are detected by image recognition. The AR generation section 234 generates an augmented reality image by superimposing a CG image generated by the rendering section 232 on the timewarped camera image or by drawing a CG image replacing the timewarped camera image. The AR generation section 234 then gives the augmented reality image to the post-processing section 236.

FIGS. 5A to 5E are diagrams for describing examples of augmented reality image generation performed by the image generation apparatus 200 according to the present embodiment.

Figure 5A:
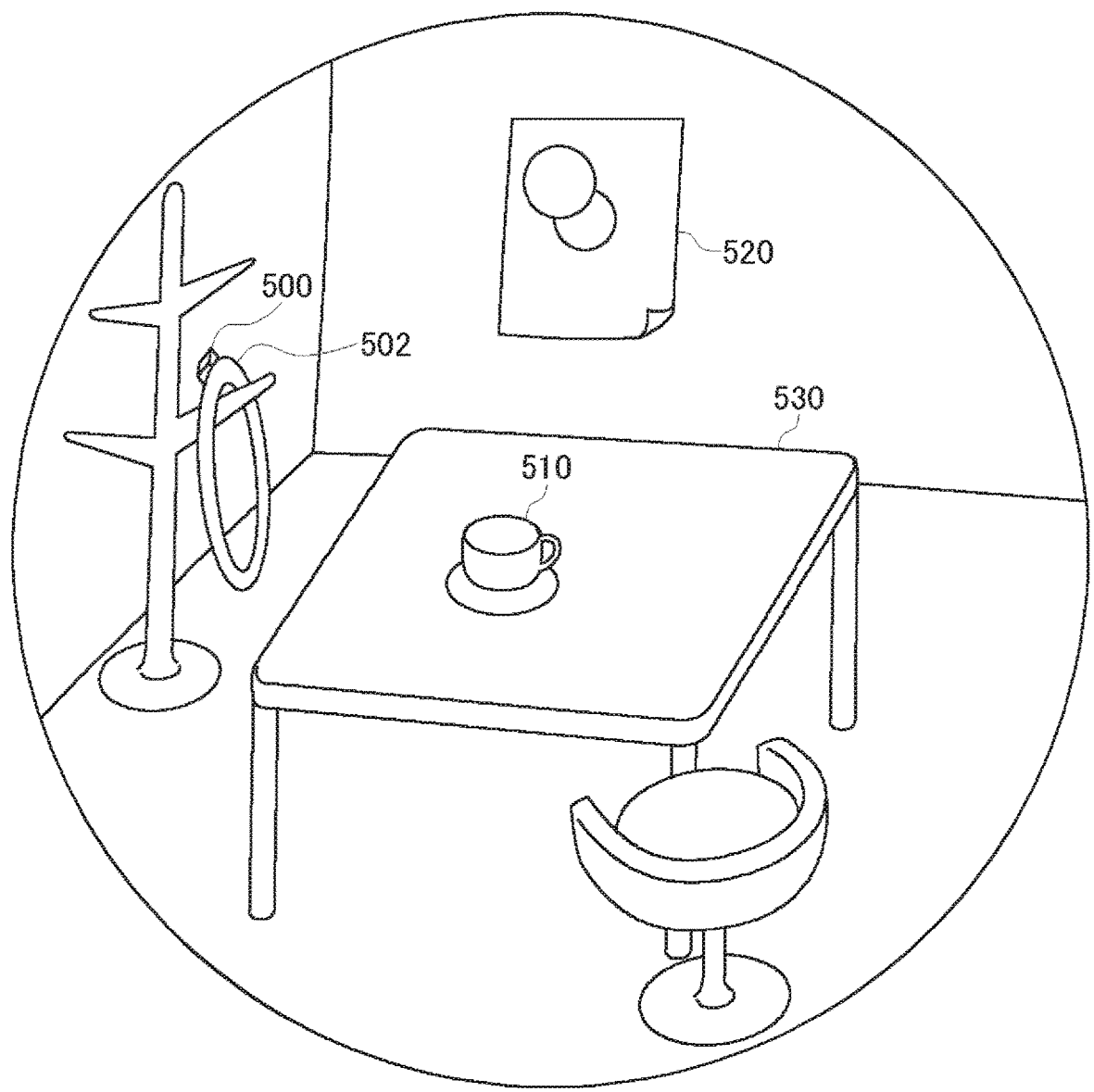
FIG. 5A is a diagram for describing an example of augmented reality image generation performed by an image generation apparatus 200 according to the present embodiment.

FIG. 5A is a diagram for describing a screen displayed on the display panel 32 of the head-mounted display 100. Here, the head-mounted display 100 is of a video-transmissive type and displays a video of the outside world shot by the camera mounted in the head-mounted display 100.

As can be seen from the video of the outside world, the user is in a room. There are a table 530 and a chair in front of the user. A coffee cup 510 is on the table 530. The moving object 502 with the tracker 500 is hung on a clothes stand near the wall. Further, there is a poster 520 on the front wall. The user can pick up the moving object 502 hung on the clothes stand and freely move the moving object 502. By viewing a partial space (here, the inside of the hoop) created by the moving object 502 from the viewpoint of the user, the user can specify the AR region.

Figure 5B:
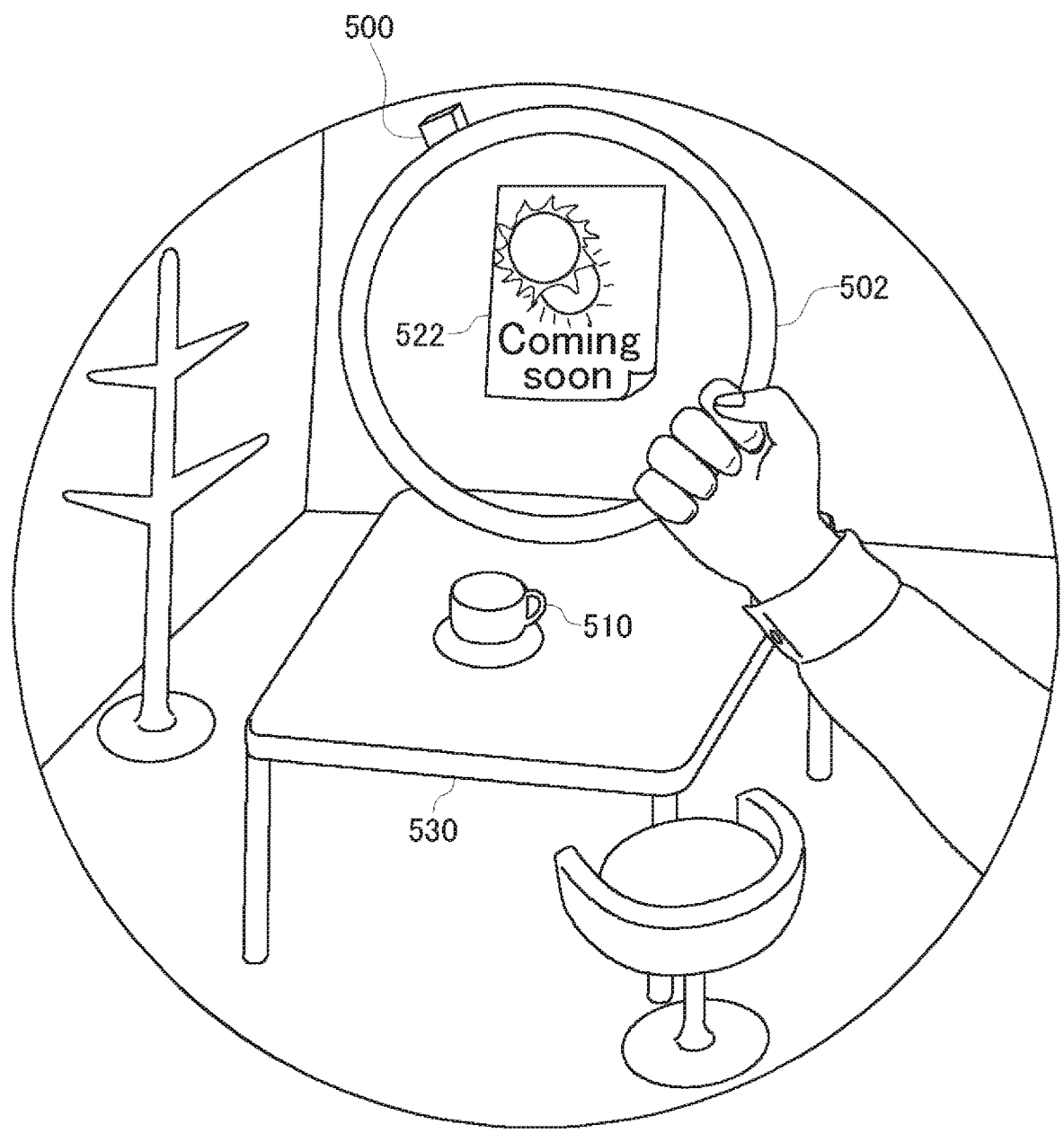
FIG. 5B is a diagram for describing an example of augmented reality image generation performed by the image generation apparatus 200 according to the present embodiment.

FIG. 5B is a screen displayed on the display panel 32 in a case where the user picks up the moving object 502, holds up the moving object 502 in front of the user, and views the poster 520 of FIG. 5A on the wall through the hoop. The inside of the hoop is the AR region. Superimposing a CG image on a camera image or drawing a CG image replacing the camera image generates an augmented reality image inside the hoop. Inside the hoop, an AR effect is added to the poster 520 illustrated in FIG. 5A, through which the poster 520 is transformed into an AR poster 522 like the one illustrated in FIG. 5B. In the AR poster 522, the text "Coming soon" is superimposed on a blank portion of the original poster 520 as a CG image, and an effect is added to a picture portion of the original poster 520. A normal camera image is visible outside the hoop.

Figure 5C:
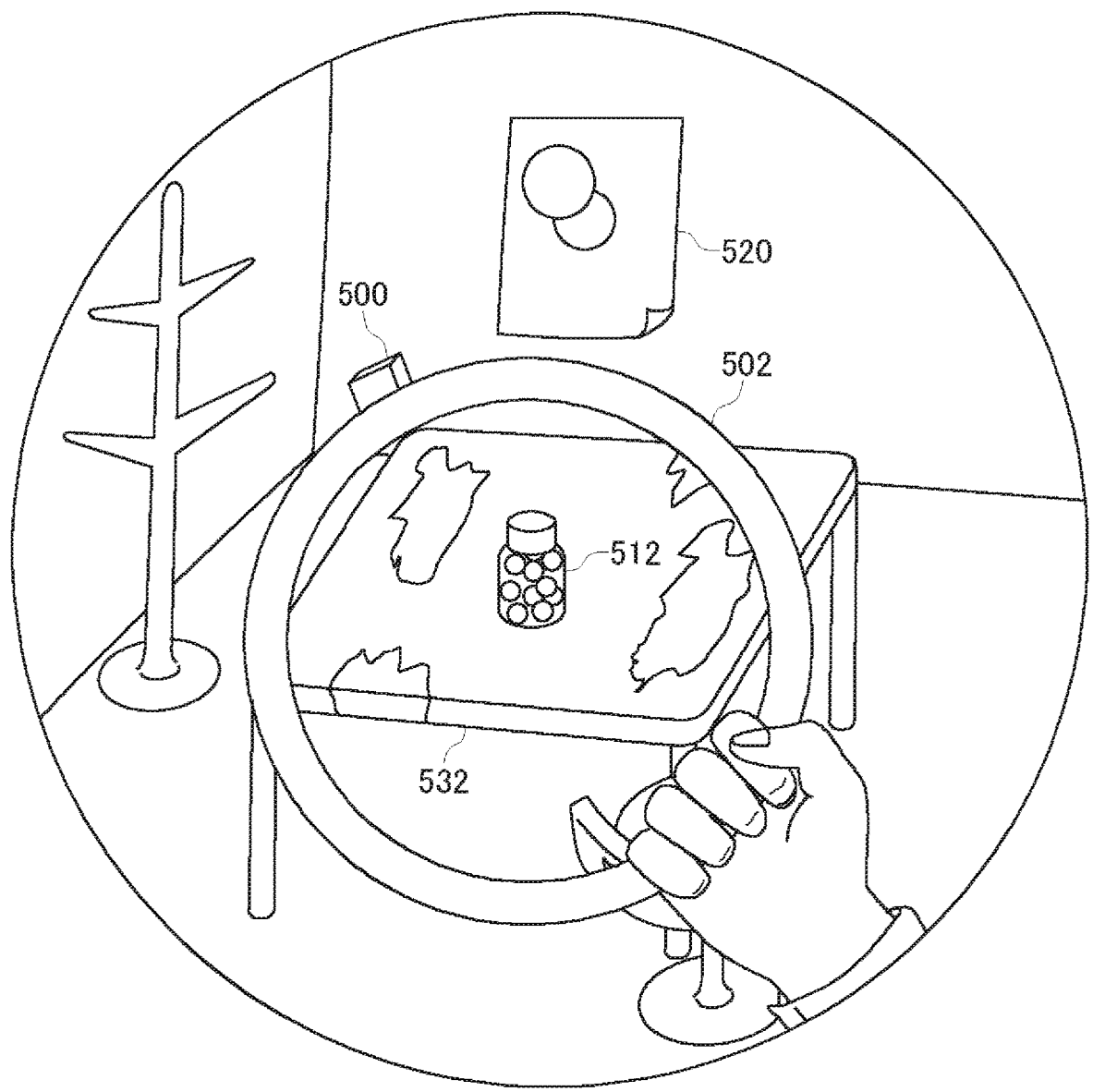
FIG. 5C is a diagram for describing an example of augmented reality image generation performed by the image generation apparatus 200 according to the present embodiment.

FIG. 5C is a screen displayed on the display panel 32 in a case where the user brings the moving object 502 held by the hand closer to the user and views the table 530 of FIG. 5A through the hoop. The area of the AR region inside the hoop is larger than the area of the AR region illustrated in FIG. 5B. An augmented reality image is generated in the AR region inside the hoop. A CG texture is pasted on the surface of the table 530 illustrated in FIG. 5A, through which the table 530 is transformed into an AR table 532 like the one illustrated in FIG. 5C. Further, the coffee cup 510 placed on the original table 530 is replaced with a virtual object 512 generated using CG. The outside of the hoop remains unchanged from the camera image.

Figure 5D:
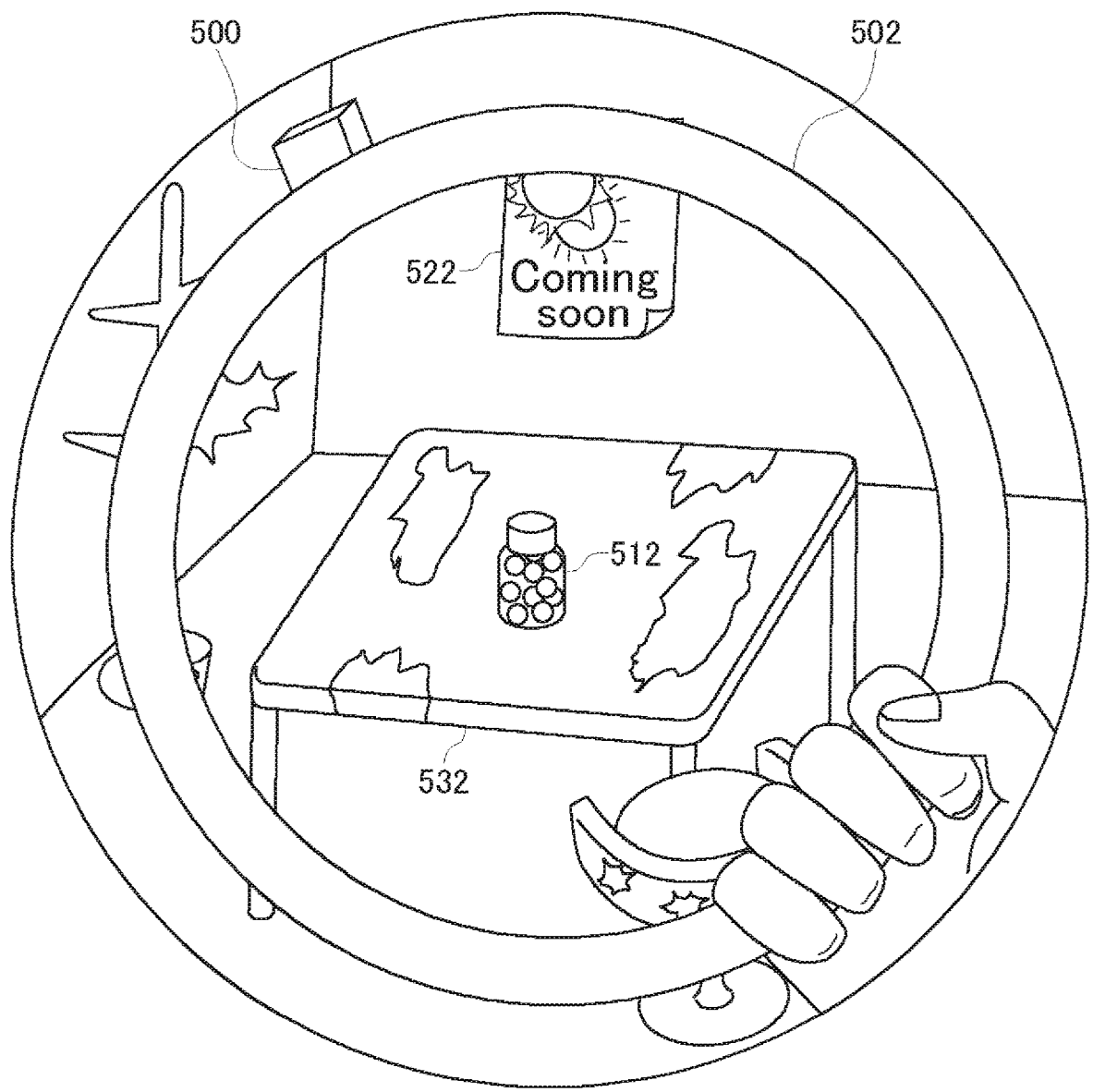
FIG. 5D is a diagram for describing an example of augmented reality image generation performed by the image generation apparatus 200 according to the present embodiment.

FIG. 5D is a screen displayed on the display panel 32 in a case where the user brings the moving object 502 even closer to the user. The area of the AR region inside the hoop is even larger than the area of the AR region illustrated in FIG. 5C. Inside the hoop, the poster 520, the table 530, the chair, the clothes stand, and the like illustrated in FIG. 5A are visible with AR effects added thereto. In addition to the AR poster 522 described with reference to FIG. 5B and the AR table 532 and the virtual object 512 described with reference to FIG. 5C, a CG texture is pasted on the surface of the chair, and an effect is also added to the clothes stand.

Figure 5E:
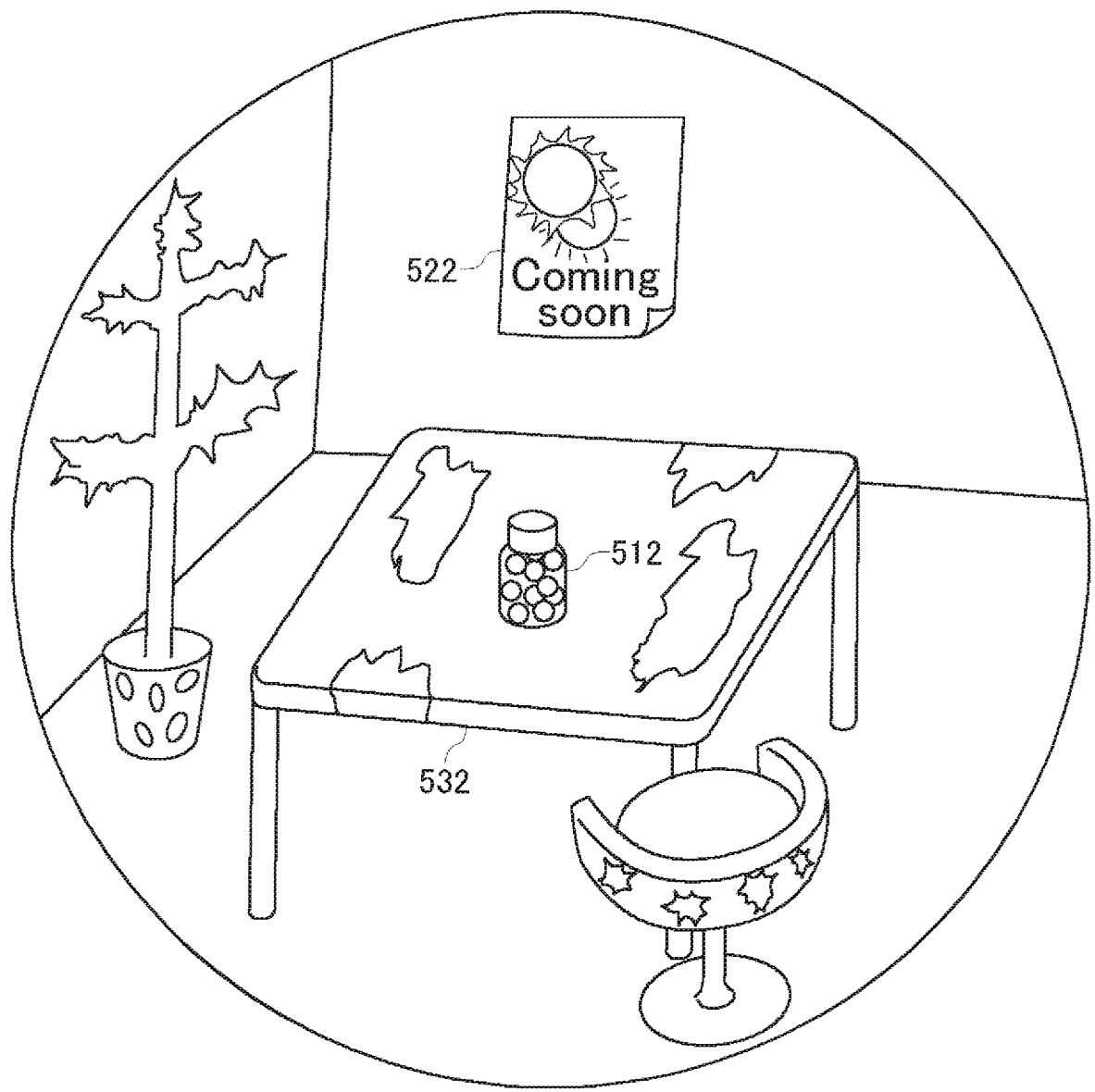
FIG. 5E is a diagram for describing an example of augmented reality image generation performed by the image generation apparatus 200 according to the present embodiment.

FIG. 5E is a screen displayed on the display panel 32 in a case where the user even puts the hoop, which is the moving object 502, over the user's head and through the user's body. The hoop is no longer visible on the screen and the AR region expands to the entire screen. Thus, AR effects are added to the entire screen.

As described with reference to FIGS. 5A to 5E, the shape and area of the AR region corresponding to the moving object 502 such as the hoop change according to a positional relation and distance between the user and the moving object 502. An augmented reality image is generated in the generated AR region. As the user brings the moving object 502 closer to the user, the AR region becomes wider. Accordingly, the augmented reality image displayed on the display panel 32 of the head-mounted display 100 becomes wider. By allowing the user to move the moving object 502 freely, the user can control the position and area of the region where the augmented reality image is displayed. Accordingly, it is possible to reduce the feeling of discontinuity and strangeness at the time of transition from the camera image to the augmented reality image.

In a case where the distance between the user and the moving object 502 exceeds a predetermined threshold value, the AR region may remain unchanged from a camera image. After the distance between the user and the moving object 502 becomes equal to or less than the predetermined threshold value, an augmented reality image may be generated in the AR region. With this configuration, bringing the moving object 502 closer to the user himself/herself functions as a switch to switch to the augmented reality image. Augmented reality (AR effect) in the AR region may be strengthened as the distance between the user and the moving object 502 decreases. For example, as the user brings the face closer to the moving object 502, the number and amount of effects added to the camera image may be increased, or more real objects may be replaced with virtual objects.

Further, whether to generate an augmented reality image in the AR region and an extent to which an AR effect is applied may be determined according to a change in the orientation of the moving object 502 made by the user, such as by tilting the moving object 502 or making the moving object 502 face the front. For example, the AR effect may be weakened or eliminated when the user tilts the moving object 502, while the AR effect may be strengthened when the user makes the moving object 502 face the front.

In this manner, the presence or absence of the AR effect in the AR region and the extent to which the AR effect is applied can be changed according to the positional relation and distance between the user and the moving object 502.

Further, different rendering can be performed inside and outside the hoop. Inside the hoop, it is possible to realize a representation where it appears that a hole is created in the space by the hoop by using depth information of an object on the front side of the hoop while ignoring depth information of an object on the back side of the hoop among pieces of depth information for rendering of the outside of the hoop. For example, when the user holds the hoop over the wall, it can appear that there is a hole in the wall.

Without using the moving object 502 such as the hoop, a predetermined region determined according to the position and orientation of the tracker 500 worn on a wrist, finger, or the like of the user may be used as the AR region. For example, a plane having a predetermined shape located at a predetermined distance from the position of the tracker 500 may be used as the AR region, and the direction of the plane having the predetermined shape may be changed according to the orientation of the tracker 500.

In the above examples, an AR effect is applied by changing a part of the AR region into a CG image. Alternatively, a video see-through image to which a visual effect filter is applied may be displayed in the AR region. Alternatively, a complete VR image or a VR image that utilizes the real world structure may be displayed in the AR region.

Many variations of effects can also be considered. Examples of effects include generation of particles, application of a visual effect filter, a change of luminance and color, a lens effect, zoom-in/out display, generation of a sound effect, and a change of volume of background music or a sound effect. For example, when the user moves the face closer to the moving object 502, the volume of the background music or a sound effect may be increased.

Further, a body tracking technique may be used to estimate the position and orientation of the user's body, thereby replacing the user's body appearing in a camera image with another virtual model or adding an effect as if light came out from the user's body appearing in the camera image, for example.

The moving object is not limited to a real object. The user may hold, as the moving object, a virtual object such as a gun, a sword, a stick, or a shield to be used in a game. A partial space of the real world may be determined according to the shape, position, and orientation of the virtual object, and the AR region corresponding to the partial space viewed from the viewpoint may be determined accordingly. Alternatively, a virtual hoop may be formed in the air while the user presses a button of a device such as a controller in the real-world space. In this case, the user may specify a partial space of the real world by moving the virtual hoop.

The AR region may be generated according to the shape of any of various kinds of light sources such as a real or virtual lantern held by the user. Accordingly, an AR effect can be added to the AR region illuminated by the lantern. An effect, for example, as if light or a flame were emitted from the lantern may be added to a video see-through image. By partially brightening the video see-through image in the region corresponding to the lantern or adding such an effect that the shadow of the light of the lantern casts on the real wall or the like, it is also possible to apply an AR effect as if the lantern illuminated the real world.

Figure 6A:
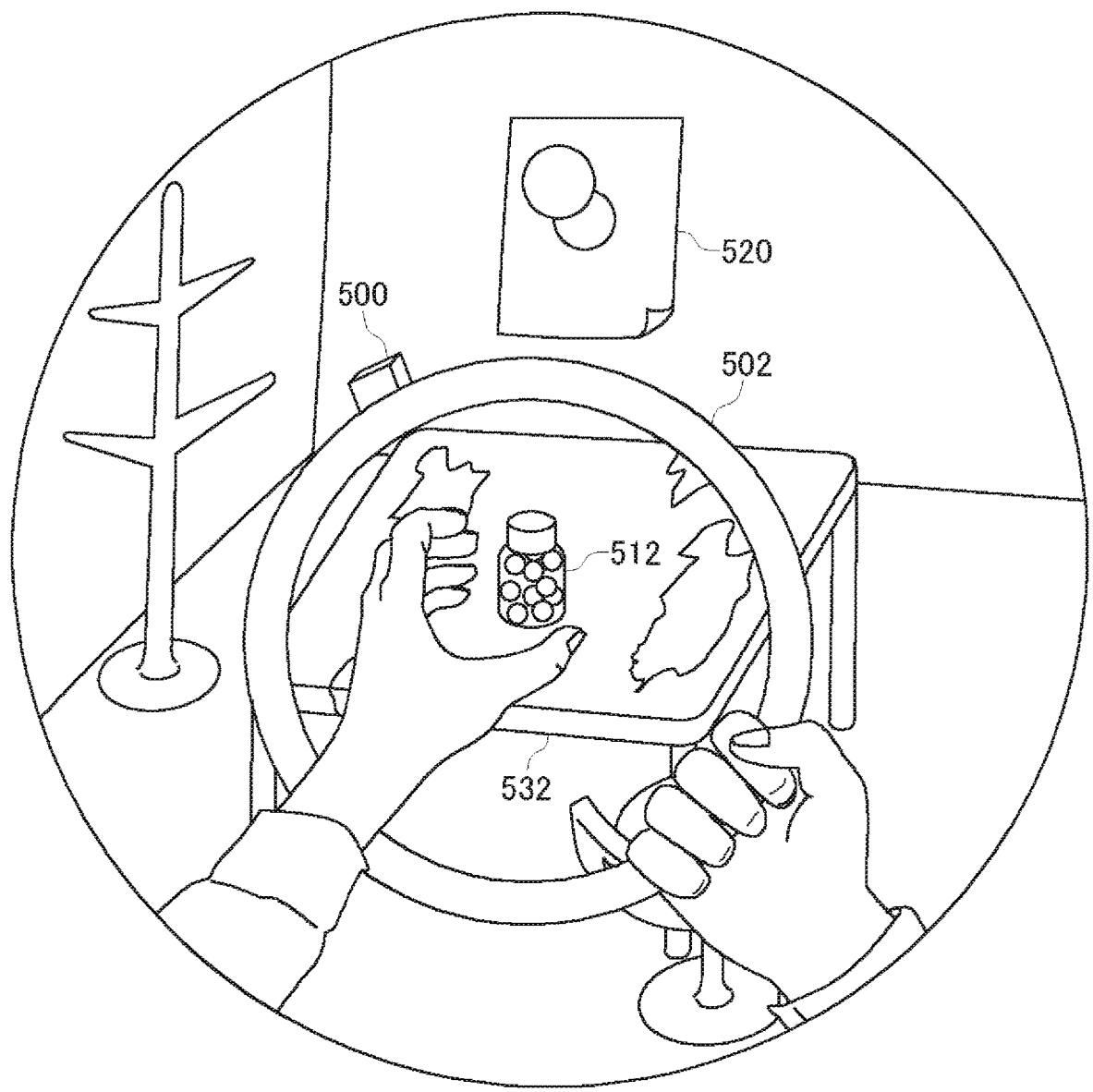
FIG. 6A is a diagram for describing another example of augmented reality image generation performed by the image generation apparatus 200 according to the present embodiment.
Figure 6B:
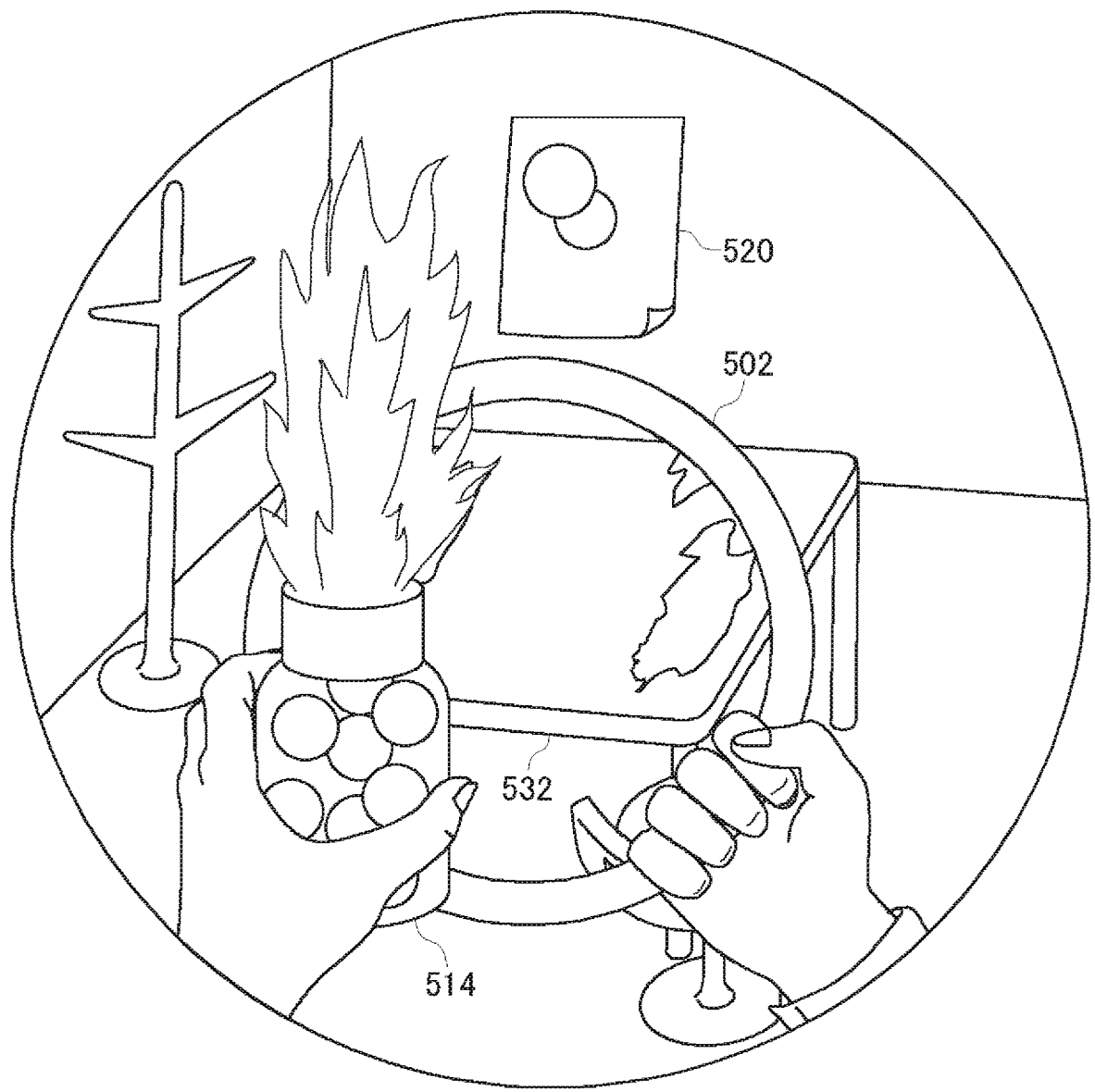
FIG. 6B is a diagram for describing another example of augmented reality image generation performed by the image generation apparatus 200 according to the present embodiment.

FIGS. 6A and 6B are diagrams for describing other examples of augmented reality image generation performed by the image generation apparatus 200 according to the present embodiment.

FIG. 6A illustrates the virtual object 512 on the AR table 532 being about to be picked up by the user who is stretching out the hand to the virtual object 512 through the hoop, which is the moving object 502. Since the virtual object 512 is the coffee cup 510 in the real world, the user grabs the coffee cup 510 in reality but it appears as if the user were grabbing the virtual object 512 on the displayed image.

FIG. 6B illustrates the virtual object 512 grabbed and taken out from the hoop by the user putting the hand inside the hoop. When the virtual object 512 is taken out from the hoop, an effect is added to the virtual object 512. In this example, something like a flame comes out of the virtual object. In the description above, the inside of the hoop and the outside of the hoop are divided such that the inside of the hoop is an augmented reality image in which a CG image is superimposed on a camera image or a CG image replacing the camera image is drawn, while the outside of the hoop is the real camera image. However, even in a case where the user puts the hand inside the hoop and takes the virtual object 512 out from the hoop, the virtual object 512 does not return to the original coffee cup 510, and a specific effect can be further applied to the virtual object 512. In this manner, an interaction between the augmented reality image and the camera image can be provided, or the moving object 502 such as the hoop can function as an interface that connects the augmented reality image to the camera image. In other words, augmented reality can also be applied to the virtual object 512 taken out from the augmented reality image in the AR region to the outside of the AR region.

In a case where the user puts the hand inside the hoop, an augmented reality image may be generated inside the hoop. Further, such an interaction that the user puts the hand inside the hoop may create an AR effect by adding an effect to a real object or replacing the real object with a virtual object, for example. In this manner, since the interaction between the user and the moving object 502 changes the presence or absence of the AR effect and the extent thereof in the AR region, it is possible to reduce the user's feeling of discontinuity and strangeness at the time of transition from the camera image to the augmented reality image.

Figure 7A:
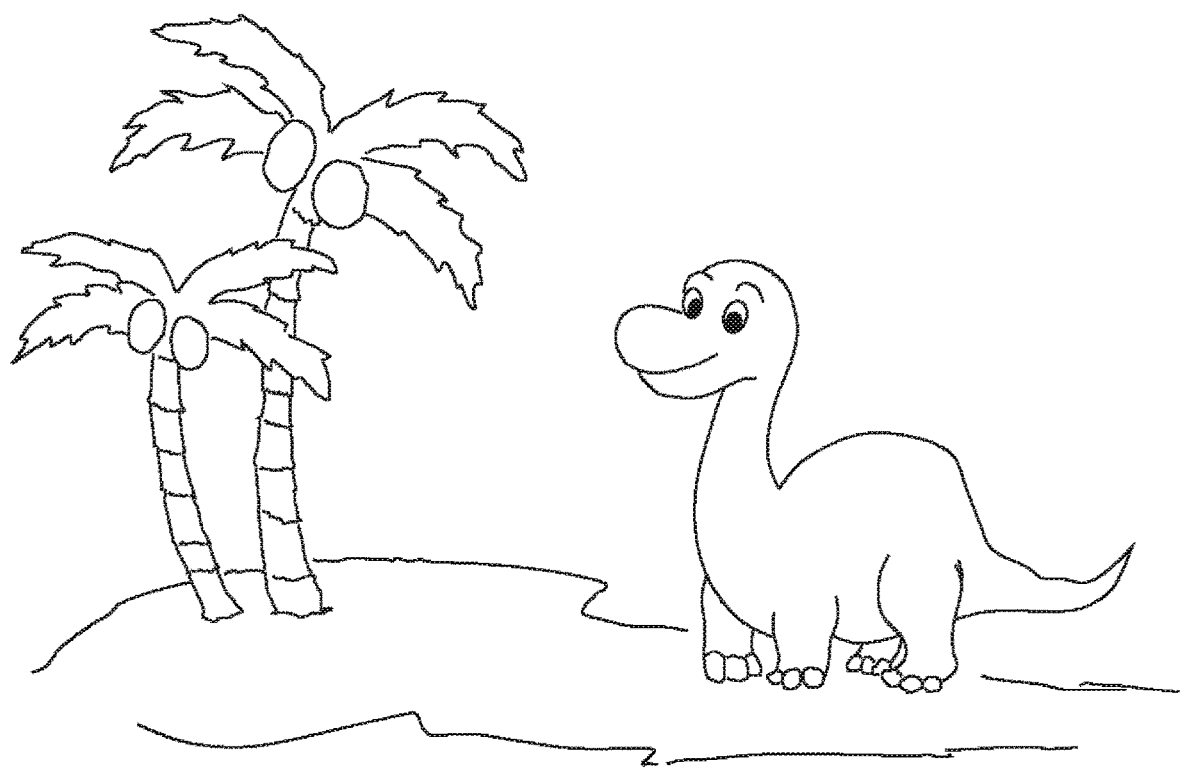
FIG. 7A is a diagram for describing still another example of augmented reality image generation performed by the image generation apparatus 200 according to the present embodiment.
Figure 7B:
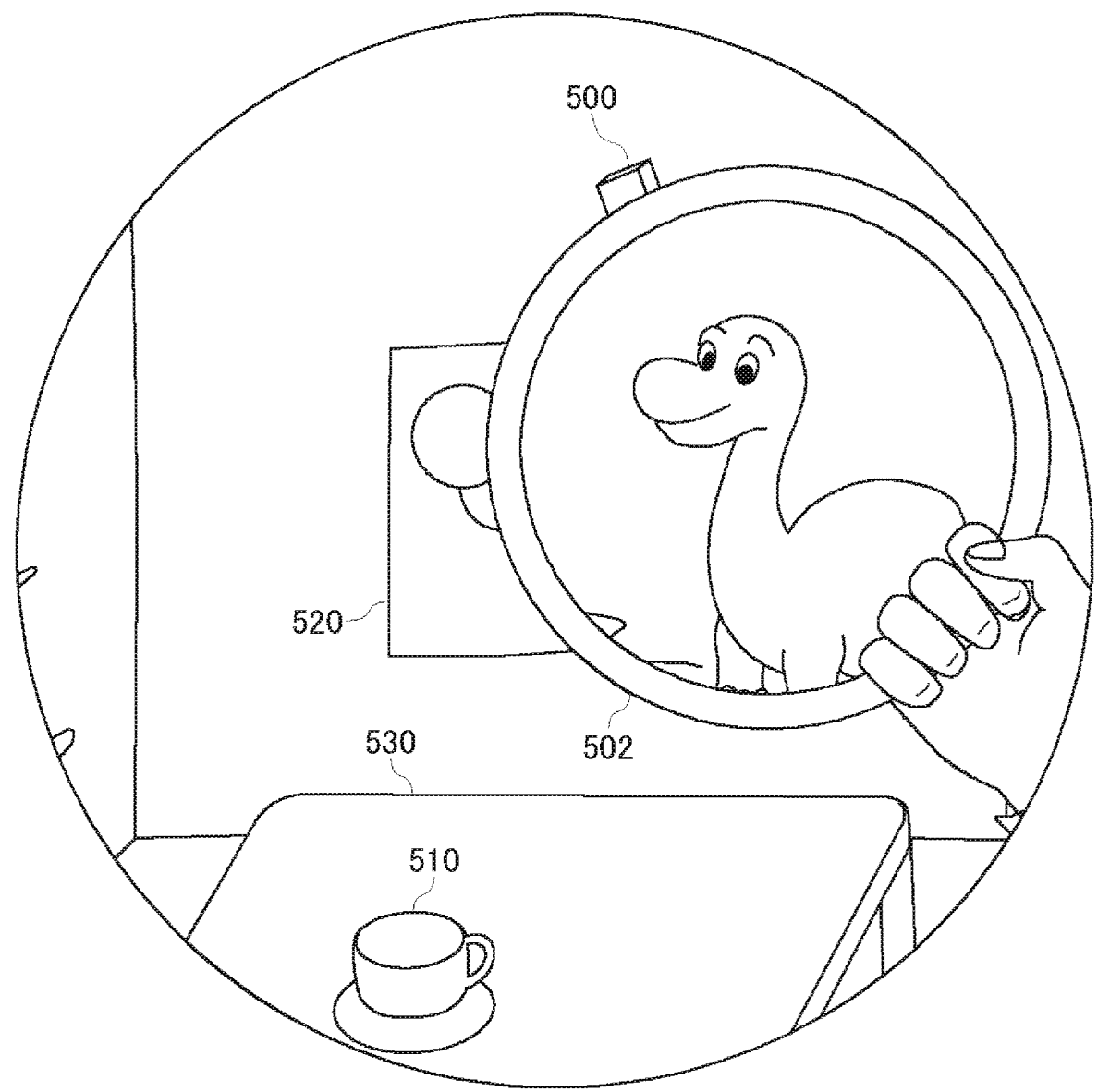
FIG. 7B is a diagram for describing still another example of augmented reality image generation performed by the image generation apparatus 200 according to the present embodiment.
Figure 7C:
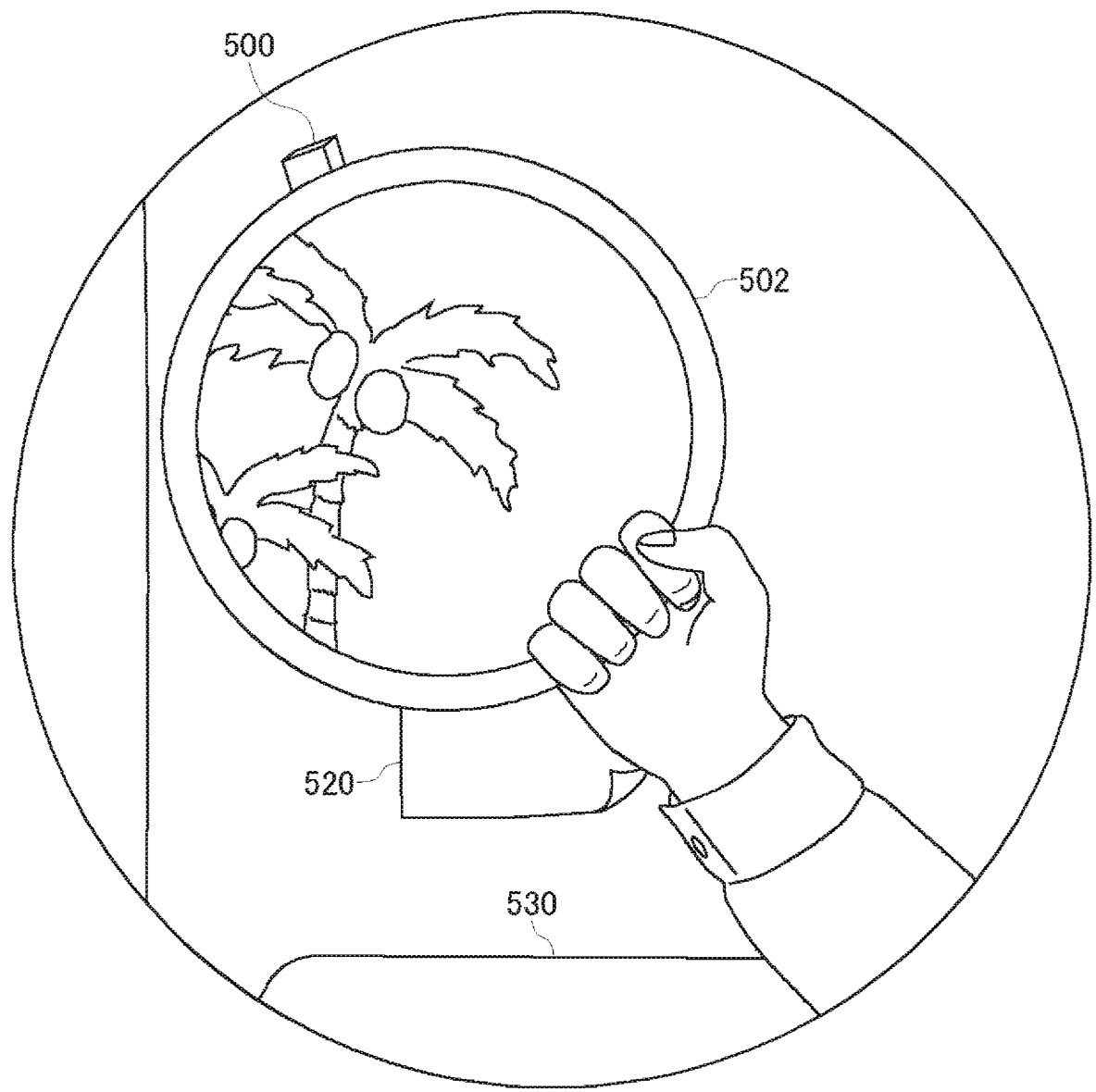
FIG. 7C is a diagram for describing still another example of augmented reality image generation performed by the image generation apparatus 200 according to the present embodiment.

FIGS. 7A to 7C are diagrams for describing still other examples of augmented reality image generation performed by the image generation apparatus 200 according to the present embodiment.

Although the user is in the room described with reference to FIG. 5A, a virtual space, like the one illustrated in FIG. 7A, exists outside the room. Here, a dinosaur is standing by two trees in the virtual space.

As illustrated in FIG. 7B, when the user makes the hoop, which is the moving object 502, face the front wall of the room on which the poster 520 is put up and views the inside of the hoop, there is a hole in the front wall, through which the user can view how the virtual space outside the room looks like. Here, the dinosaur in the virtual space illustrated in FIG. 7A is visible inside the hoop.

As illustrated in FIG. 7C, when the user moves the moving object 502 in front of the wall and views the inside of the hoop, a hole is created in another part of the wall, through which the user can peer into the virtual space. Here, a part of the trees in the virtual space illustrated in FIG. 7A is visible inside the hoop.

In this manner, when the inside of the hoop, which is the moving object 502, is viewed from the viewpoint of the user, an external virtual world that exists on the opposite side of the real world is visible inside the hoop, while a see-through video of the real space is visible outside the hoop.

Figure 8:
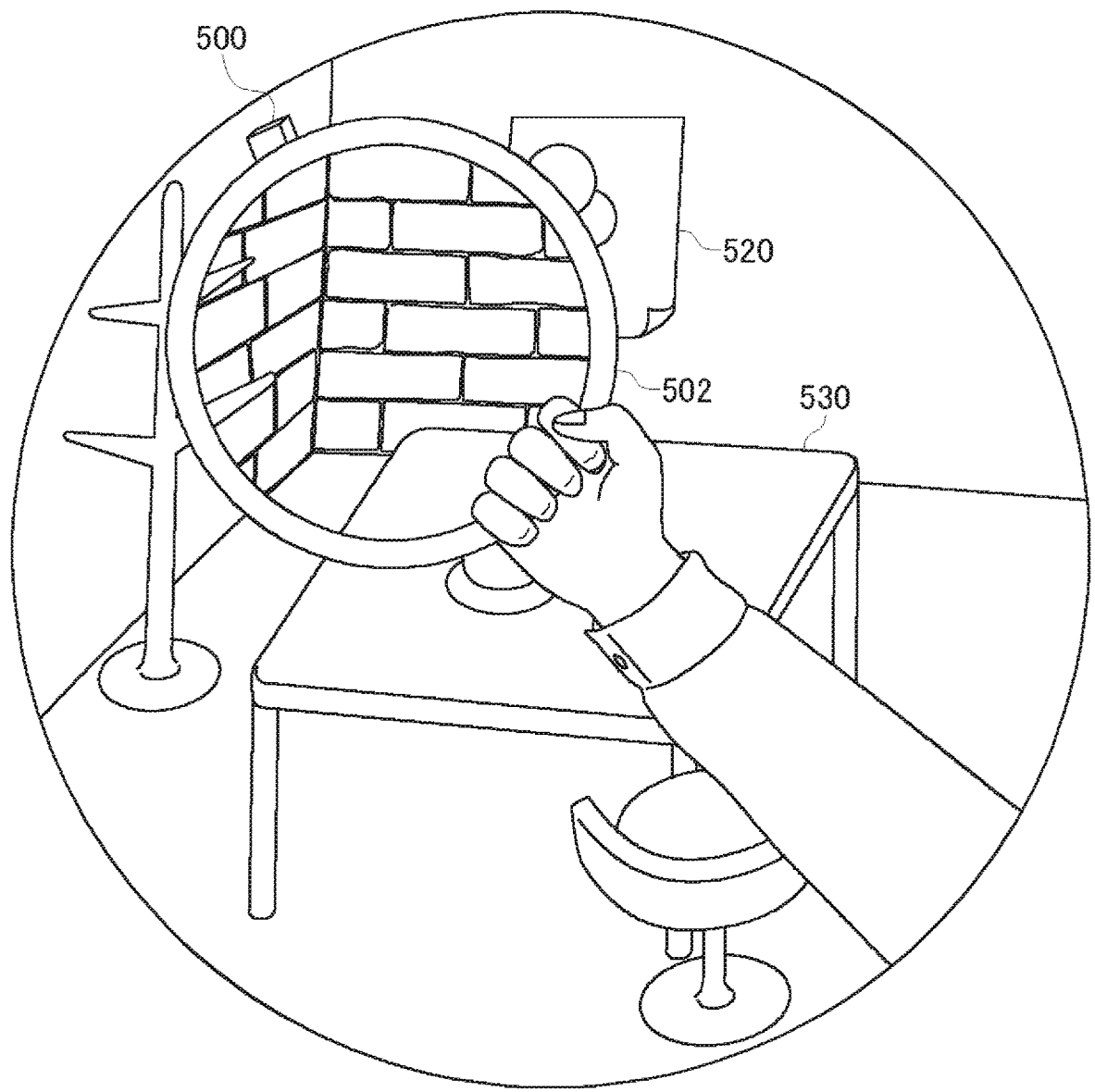
FIG. 8 is a diagram for describing yet another example of augmented reality image generation performed by the image generation apparatus 200 according to the present embodiment.

FIG. 8 is a diagram for describing yet another example of augmented reality image generation performed by the image generation apparatus 200 according to the present embodiment.

As illustrated in FIG. 8, when the user views the wall of the room through the moving object 502, a virtual block wall generated according to the shape of the wall in the real world is drawn and displayed in CG inside the hoop. It is also possible to add such a virtual effect that the virtual block wall collapses toward the opposite side of the room wall and the virtual world on the opposite side of the wall is displayed.

It is noted that the shape information and depth information of an object in the real world can be acquired by three-dimensional (3D)-scanning a real-world space. For example, depth information of the real space can be acquired using a depth sensor employing a method such as an infrared pattern, Structured Light, or time of flight (TOF). Alternatively, depth information of the real space can be acquired from parallax information of a stereo camera.

Figure 9:
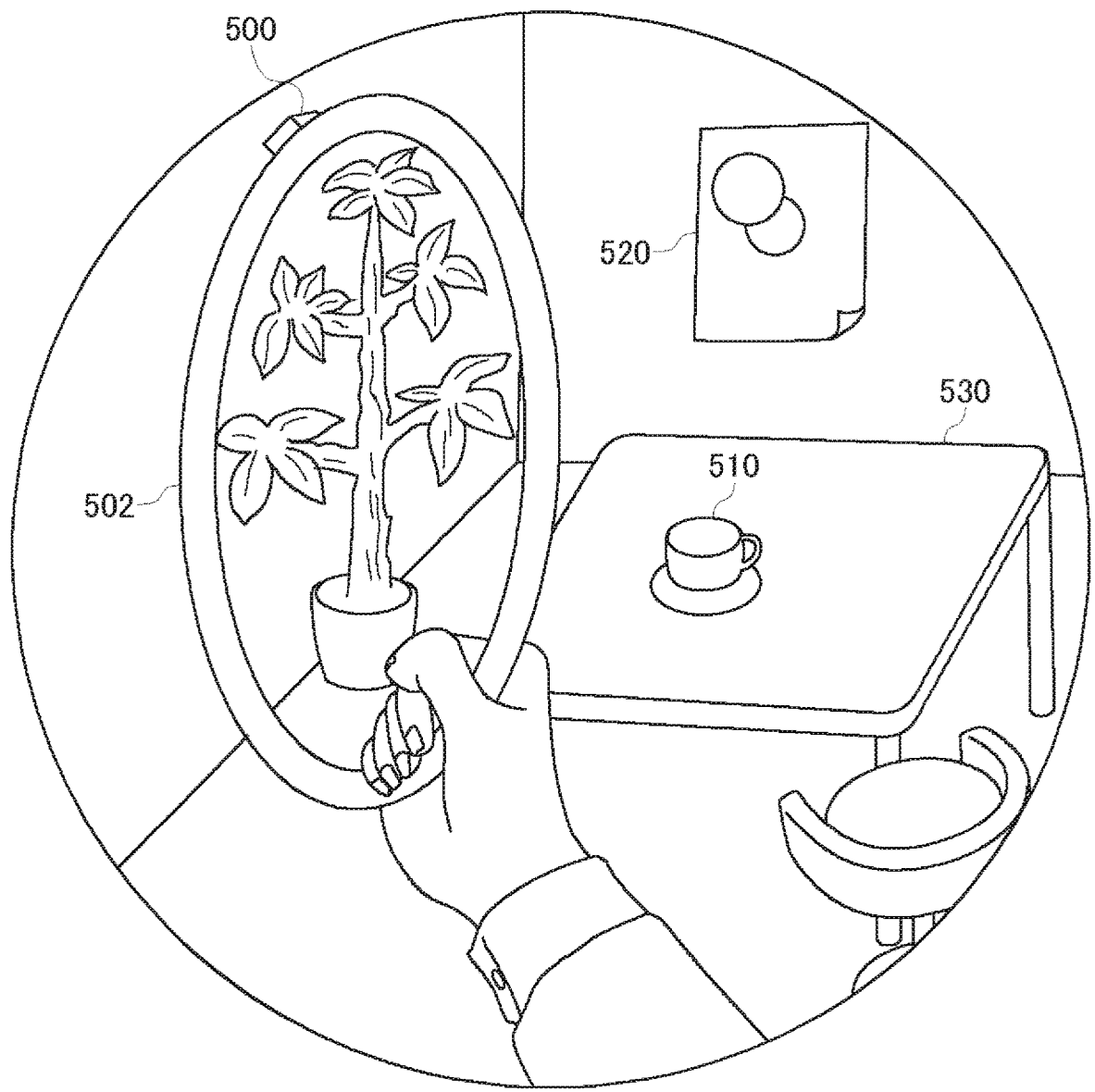
FIG. 9 is a diagram for describing a still further example of augmented reality image generation performed by the image generation apparatus 200 according to the present embodiment.

FIG. 9 is a diagram for describing a still further example of augmented reality image generation performed by the image generation apparatus 200 according to the present embodiment.

FIG. 9 illustrates an augmented reality image generated inside the hoop when the user views the clothes stand near the wall through the hoop, which is the moving object 502. By referring to the shape information and depth information of the clothes stand, a virtual foliage plant object is generated instead of the clothes stand and is drawn and displayed inside the hoop. Here, since the user tilts the hoop to view the inside of the hoop, the shape of the hoop is oval.

Figure 10A:
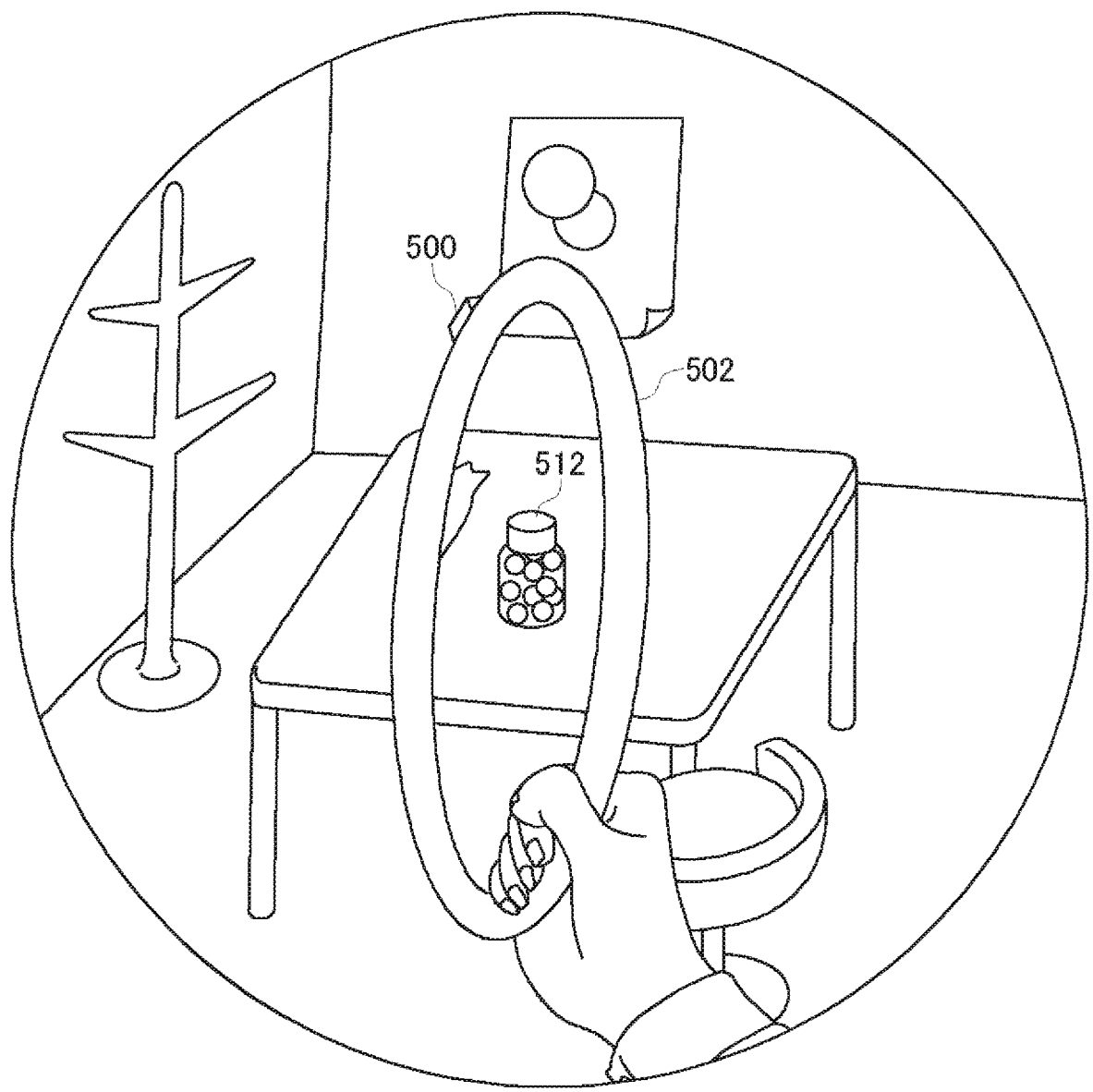
FIG. 10A is a diagram for describing a yet further example of augmented reality image generation performed by the image generation apparatus 200 according to the present embodiment.
Figure 10B:
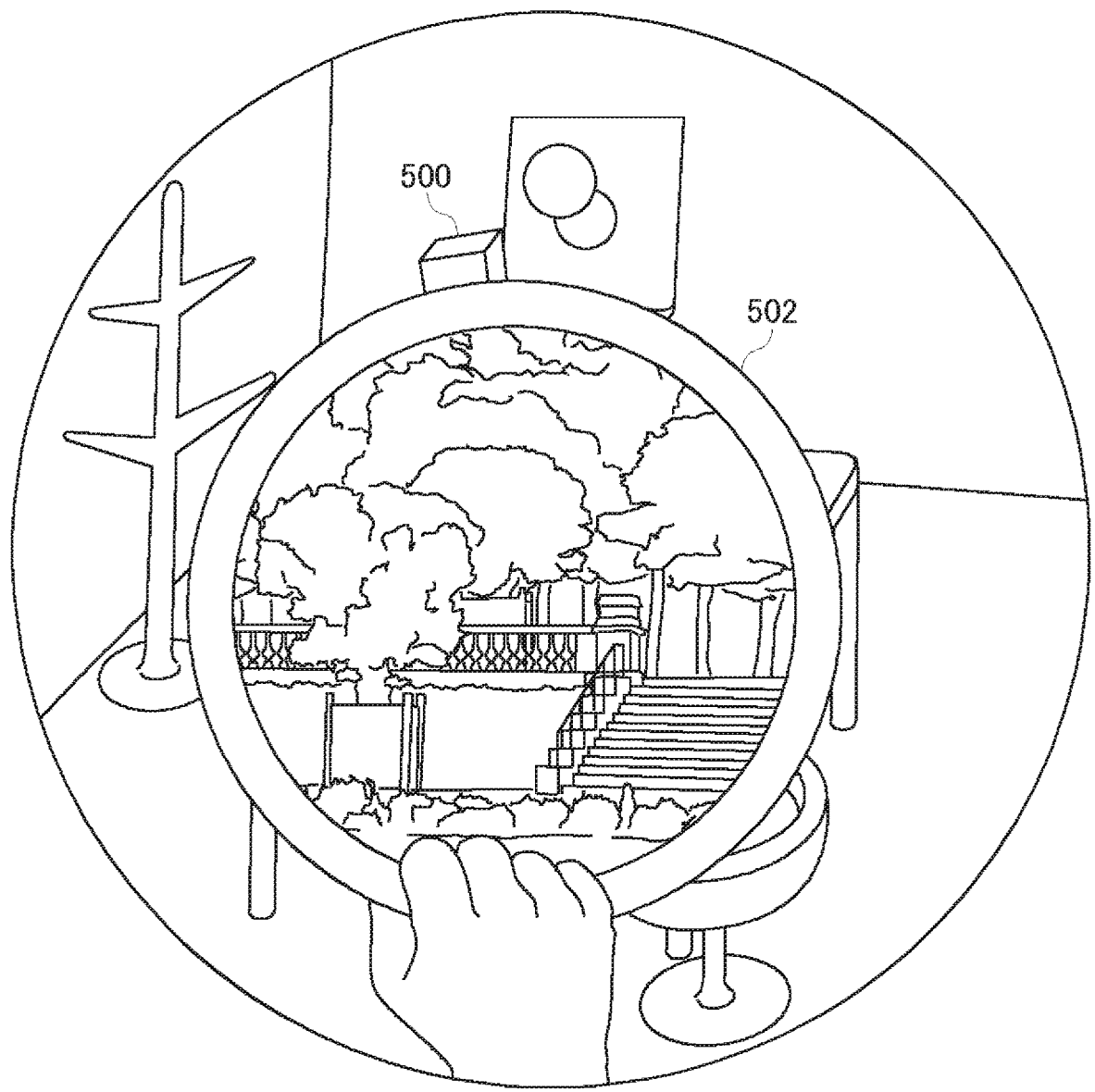
FIG. 10B is a diagram for describing a yet further example of augmented reality image generation performed by the image generation apparatus 200 according to the present embodiment.
Figure 10C:
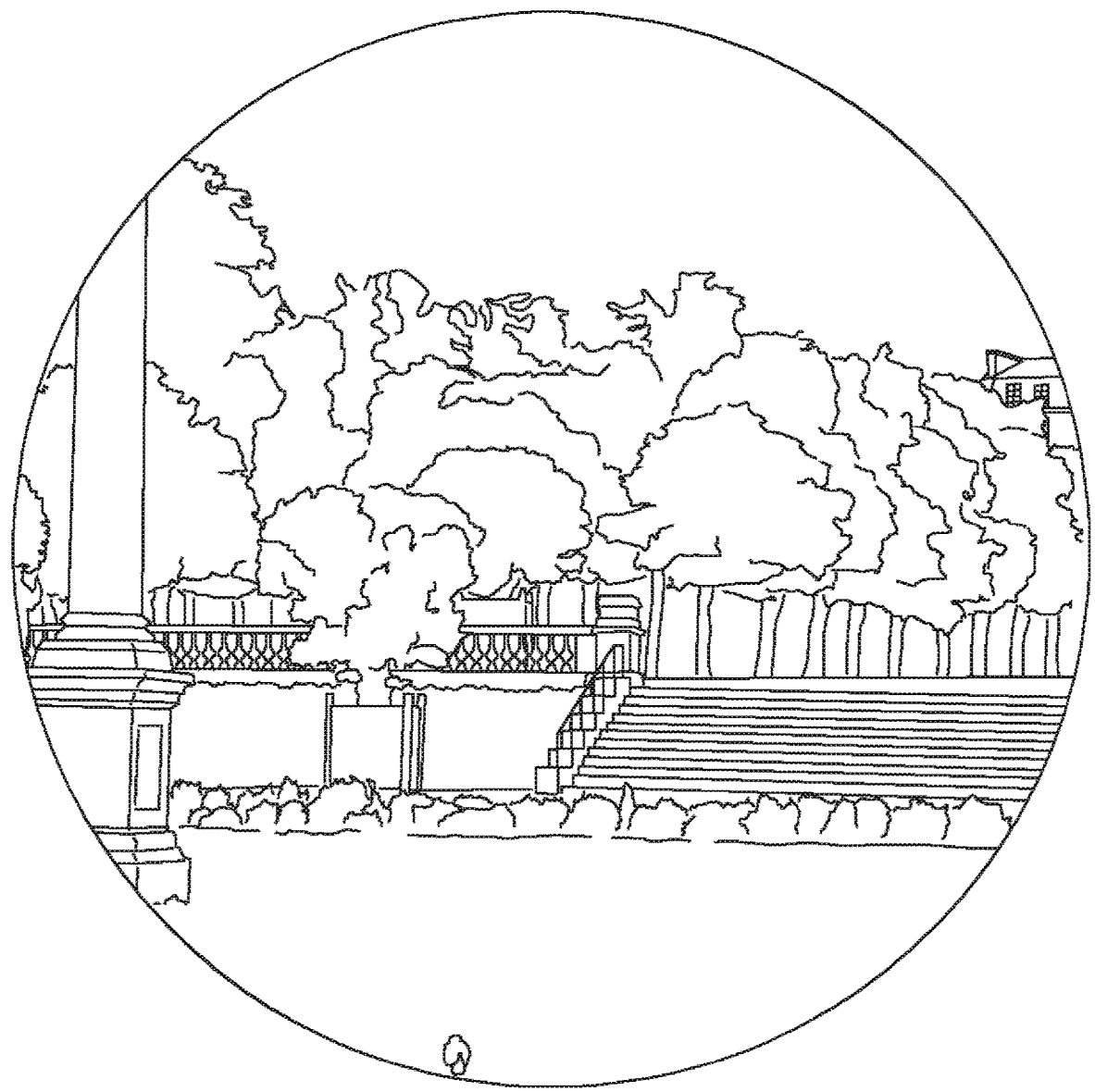
FIG. 10C is a diagram for describing a yet further example of augmented reality image generation performed by the image generation apparatus 200 according to the present embodiment.

FIGS. 10A to 10C are diagrams for describing yet further examples of augmented reality image generation performed by the image generation apparatus 200 according to the present embodiment.

FIG. 10A illustrates the hoop, which is the moving object 502, being about to be flipped over by the user. In this case, the inside of the hoop is an oval AR region, in which the virtual object 512 is visible as with FIG. 5C.

FIG. 10B illustrates the hoop completely flipped over by the user. Inside the hoop, a part of another live-action video is visible. Flipping over the hoop in this manner can switch how the inside of the hoop looks like. The operation of flipping over the hoop has a switch function to switch the video inside the hoop. When the user puts the flipped hoop through the neck, the live-action video inside the hoop expands to the entire screen as illustrated in FIG. 10C. The user can move around and observe the world of the live-action video after the switch. Although the live-action video has been described here as an example of the video after the switch, another virtual world using CG may be provided.

As described above, reversing the orientation of the moving object 502, such as flipping over the hoop, or reversing the positional relation between the user and the moving object 502 can switch the type of image displayed in the AR region. In this manner, the moving object 502 can have a channel switching function.

As described above, with the image generation apparatus 200 according to the present embodiment, the user can specify a predetermined region of the real space as the AR region in which an augmented reality image is generated. The user can freely specify the position and size of the predetermined region using the moving object 502 or the like such as the hoop. With this configuration, an AR effect is added to the position and range intended by the user, instead of being suddenly added to a camera image. Accordingly, it is possible to reduce the feeling of strangeness at the time of transition from a real video to an augmented reality video.

Further, even after an object to which an AR effect is added in the AR region is taken out from the AR region, the AR effect is continued, or an even additional AR effect is added thereto. This makes it possible to provide an effect that connects the augmented reality world to the real world. This allows the moving object 502 to act like an interface connecting the real world and the virtual world to each other.

The present invention has been described above on the basis of the embodiment. The embodiment is an exemplification, and it will be understood by those skilled in the art that various modifications can be made to combinations of each component and each processing process in the embodiment and that such modifications also fall within the scope of the present invention.

REFERENCE SIGNS LIST

10 Control section, 20 Input interface, 30 Output interface, 32 Display panel, 40 Communication control section, 42 Network adapter, 44 Antenna, 50 Storage section, 64 Orientation sensor, 70 External input/output terminal interface, 72 External memory, 80 Camera unit, 100 Head-mounted display, 200 Image generation apparatus, 210 HMD position and orientation acquisition section, 220 Viewpoint and line-of-sight setting section, 230 Image generation section, 232 Rendering section, 234 AR generation section, 236 Post-processing section, 238 Timewarp section, 240 Reprojection section, 242 Distortion processing section, 244 Moving-object position and orientation acquisition section, 246 Timewarp section, 248 AR region determination section, 250 Image signal processing section, 260 Image storage section, 280 HDMI transmission/reception section, 300 Interface, 500 Tracker, 502 Moving object.

INDUSTRIAL APPLICABILITY

The present invention can be used for an image generation technique.

The invention claimed is:

1. An image generation apparatus comprising:
a determination section configured to determine, as an augmented reality region, a region that corresponds to a partial space occupied by a moving object in a real world and viewed from a viewpoint of a user, the moving object being configured to be moved by the user;
an augmented reality generation section configured to generate an augmented reality image in the augmented reality region in a shot image of the real world;
an acquisition section configured to acquire a position and an orientation of the moving object; and
a timewarp section, wherein
the determination section determines, as the augmented reality region, a region that corresponds to the partial space determined according to the position and the orientation of the moving object and viewed from the viewpoint of the user,
the timewarp section is configured to, when the moving object is moved by the user to a distance between the user and the moving object as viewed from the viewpoint of the user exceeding a predetermined threshold value, maintain the augmented reality region unchanged from a camera image, and
the timewarp section is configured to, when the moving object is moved by the user to a distance between the user and the moving object as viewed from the viewpoint of the user equal to or less than the predetermined threshold value, transform the position and the orientation of the moving object such that the position and the orientation of the moving object correspond to a point in time of acquisition of a position and an orientation of the user.

2. The image generation apparatus according to claim 1, wherein the acquisition section acquires the position and the orientation of the moving object detected by a tracker provided in the moving object.

3. The image generation apparatus according to claim 2, wherein the timewarp section transforms the position and the orientation of the moving object detected by the tracker such that the position and the orientation of the moving object correspond to the point in time of the acquisition of the position and the orientation of the user.

4. The image generation apparatus according to claim 1, wherein the acquisition section acquires the position and the orientation of the moving object detected by image recognition from the shot image.

5. The image generation apparatus according to claim 4, wherein the timewarp section transforms the shot image such that the shot image corresponds to the point in time of the acquisition of the position and the orientation of the user.

6. The image generation apparatus according to claim 1, wherein the augmented reality generation section generates the augmented reality image according to a shape of the real world.

7. The image generation apparatus according to claim 1, wherein the augmented reality generation section determines, according to a positional relation or a distance between the user and the moving object, whether or not to generate the augmented reality image in the augmented reality region or an extent to which augmented reality is applied to the augmented reality image generated in the augmented reality region.

8. The image generation apparatus according to claim 1, wherein the augmented reality generation section switches a type of an image displayed in the augmented reality region, according to an orientation of the moving object.

9. The image generation apparatus according to claim 1, wherein the augmented reality generation section applies augmented reality to a virtual object taken out from the augmented reality image in the augmented reality region to an outside of the augmented reality region.

10. The image generation apparatus according to claim 1, wherein the augmented reality generation section applies an effect to the shot image in the augmented reality region in addition to or instead of superimposing a computer graphics image on the augmented reality region.

11. An image generation method comprising:
  determining, as an augmented reality region, a region that corresponds to a partial space occupied by a moving object in a real world and viewed from a viewpoint of a user, the moving object being configured to be moved by the user;
  generating an augmented reality image in the augmented reality region in a shot image of the real world; and
  acquiring a position and an orientation of the moving object,
  wherein
  the determining includes determining, as the augmented reality region, a region that corresponds to the partial space determined according to the position and the orientation of the moving object and viewed from the viewpoint of the user,
  when the moving object is moved by the user to a distance between the user and the moving object as viewed from the viewpoint of the user exceeding a predetermined threshold value, maintaining the augmented reality region unchanged from a camera image, and
  when the moving object is moved by the user to a distance between the user and the moving object as viewed from the viewpoint of the user equal to or less than the predetermined threshold value, transforming the position and the orientation of the moving object such that the position and the orientation of the moving object correspond to a point in time of acquisition of a position and an orientation of the user.

12. A non-transitory, computer readable storage medium containing a program, which when executed by a computer, causes the computer to perform an image generation method by carrying out actions, comprising:
  determining, as an augmented reality region, a region that corresponds to a partial space occupied by a moving object in a real world and viewed from a viewpoint of a user, the moving object being configured to be moved by the user;
  generating an augmented reality image in the augmented reality region in a shot image of the real world; and
  acquiring a position and an orientation of the moving object,
  wherein
  the determining includes determining, as the augmented reality region, a region that corresponds to the partial space determined according to the position and the orientation of the moving object and viewed from the viewpoint of the user,
  when the moving object is moved by the user to a distance between the user and the moving object as viewed from the viewpoint of the user exceeding a predetermined threshold value, maintaining the augmented reality region unchanged from a camera image, and
  when the moving object is moved by the user to a distance between the user and the moving object as viewed from the viewpoint of the user equal to or less than the predetermined threshold value, transforming the position and the orientation of the moving object such that the position and the orientation of the moving object correspond to a point in time of acquisition of a position and an orientation of the user.

* * * * *